US010907970B2

(12) United States Patent
    Eldic

(10) Patent No.: US 10,907,970 B2
(45) Date of Patent: Feb. 2, 2021

(54) RELIABILITY DETERMINATION OF LOCATION UPDATES IN MULTIPATH ENVIRONMENTS

(71) Applicant: BLUEDOT INNOVATION PTY LTD, East Melbourne (AU)

(72) Inventor: Filip Eldic, East Melbourne (AU)

(73) Assignee: Bluedot Innovation PTY Ltd, East Melbourne (AU)

( * ) Notice: Subject to any disclaimer, the term of this patent is extended or adjusted under 35 U.S.C. 154(b) by 173 days.

(21) Appl. No.: 16/078,615

(22) PCT Filed: Sep. 13, 2017

(86) PCT No.: PCT/AU2017/000196
    § 371 (c)(1),
    (2) Date: Aug. 21, 2018

(87) PCT Pub. No.: WO2018/049464
    PCT Pub. Date: Mar. 22, 2018

(65) Prior Publication Data
    US 2019/0056511 A1    Feb. 21, 2019

(30) Foreign Application Priority Data
    Sep. 13, 2016    (AU) .................................. 2016903679

(51) Int. Cl.
    *G01C 21/16*    (2006.01)
    *H04W 4/029*    (2018.01)
    (Continued)

(52) U.S. Cl.
    CPC ............. *G01C 21/16* (2013.01); *G01C 21/12* (2013.01); *G01S 19/01* (2013.01); *G01S 19/39* (2013.01); *G01S 19/396* (2019.08); *H04W 4/029* (2018.02)

(58) Field of Classification Search
    CPC combination set(s) only.
    See application file for complete search history.

(56) References Cited

U.S. PATENT DOCUMENTS

| 10,362,442 | B2 * | 7/2019 | Eldic ...................... H04W 4/029 |
| 2005/0162309 | A1 * | 7/2005 | Humphries ............. G01S 19/05 |
| | | | 342/357.31 |

(Continued)

FOREIGN PATENT DOCUMENTS

WO    WO 2012/045483 A1    4/2012

OTHER PUBLICATIONS

PCT International Search Report and Written Opinion, PCT Application No. PCT/AU2017/000196, dated Nov. 29, 2017, 11 pages.
(Continued)

*Primary Examiner* — Mamadou L Diallo
(74) *Attorney, Agent, or Firm* — Fenwick & West LLP

(57) ABSTRACT

A method of determining the unreliability of a location determination of a device knowing at least the prior determined location and time of determining the location of the device is described. There is a need to determine a first location of the device and a second location of the device, and if the second location of the device has at least one of the group of characteristics of the device being, the speed; the distance difference between the first location and the second location of the device; the acceleration of the device; the bearing of the path of the device then determining whether the second location determination of the device is unreliable, is achieved by checking if one or more of the following conditions are true: the speed of the device at the second location is greater than a predetermined speed; the distance difference between the first location and the second location of the device is greater than a predetermined distance; the acceleration of the device is greater than a predetermined the rate of change of the speed between the
(Continued)

first location and the second location of the device; the difference in, the bearing of the path of the device between the prior location and the first location, and the bearing of the path of the device between first location and the second location, is greater than a predetermined angle in any plane; or the time period, between the determination of the first location of the device and the determination of the second location of the device, is greater than a predetermined period.

15 Claims, 20 Drawing Sheets

(51) Int. Cl.
*G01S 19/01* (2010.01)
*G01S 19/39* (2010.01)
*G01C 21/12* (2006.01)

(56) References Cited

U.S. PATENT DOCUMENTS

| | | | |
|---|---|---|---|
| 2009/0009397 A1* | 1/2009 | Taylor | G01S 19/34 342/451 |
| 2009/0009398 A1 | 1/2009 | Taylor et al. | |
| 2010/0117899 A1 | 5/2010 | Papadimitratos et al. | |
| 2010/0190513 A1* | 7/2010 | Andreasson | H04W 4/18 455/456.3 |
| 2010/0332125 A1 | 12/2010 | Tan et al. | |
| 2012/0309409 A1 | 12/2012 | Grosman et al. | |
| 2014/0232570 A1 | 8/2014 | Skinder et al. | |
| 2014/0232593 A1* | 8/2014 | Varoglu | G01S 19/48 342/357.28 |
| 2015/0088345 A1* | 3/2015 | Nandedkar | B61L 25/021 701/20 |
| 2015/0350833 A1* | 12/2015 | Kazemi | H04W 4/029 455/456.6 |
| 2017/0013409 A1* | 1/2017 | Cerchio | H04W 72/0473 |
| 2017/0337745 A1* | 11/2017 | Martin | G01S 19/14 |
| 2019/0186927 A1* | 6/2019 | Koponen | G01C 21/30 |

OTHER PUBLICATIONS

Namiot D. et al., "Geofence and Network Proximity," eds.: Balandin S. et al.: "Internet of Things, Smart Spaces, and Next Generation Networking", Lecture Notes in Computer Science, Springer, Berlin, Heidelberg, 2013, pp. 1-6, vol. 8121.

Extended European Search Report, European Application No. 17849912.5, dated Nov. 29, 2019, 8 pages.

* cited by examiner

| parameter | LU1 | LU2 | LU3 | LU4 |
|---|---|---|---|---|
| time | UNINITALISED_ | real value | real value | real value |
| distance | UNINITALISED_ | real value | real value | real value |
| speed | UNINITALISED_ | real value | real value | real value |
| acceleration | UNINITALISED_ | UNINITALISED_ | real value | real value |
| bearing | UNINITALISED_ | real value | real value | real value |

| | Values | | | | |
|---|---|---|---|---|---|
| Row Labels | Time | Distance | Speed | Acceleration | Bearing |
| drive | 30 | 20 | 7 | 323 | 80 |
| indoors | 30 | 0 | 0 | 14 | 24 |
| outdoors | 23 | 7 | 6 | 72 | 260 |
| transport | 41 | 53 | 16 | 232 | 96 |
| (blank) | | | | | |
| Grand Total | 124 | 80 | 29 | 641 | 460 |

| Row Labels | Values total | ontrack | acc<30.0 | bounce? | bounce_intr | interruption | ontrack | acc<30.0 | Bounce |
|---|---|---|---|---|---|---|---|---|---|
| drive | 49394 | 48278 | 674 | 426 | 8 | 8 | 97.74% | 1.36% | 0.86% |
| indoors | 4163 | 1780 | 2319 | 64 | 0 | 0 | 42.76% | 55.71% | 1.54% |
| outdoors | 37510 | 36755 | 411 | 342 | 1 | 1 | 97.99% | 1.10% | 0.91% |
| transport | 8620 | 6470 | 1758 | 377 | 8 | 7 | 75.06% | 20.39% | 4.37% |
| Grand Total | 99687 | 93283 | 5162 | 1209 | 17 | 16 | 93.58% | 5.18% | 1.21% |

$$dlon = lon2 - lon1$$
$$dlat = lat2 - lat1$$
$$a = (\sin(dlat/2))^2 + \cos(lat1) * \cos(lat2) * (\sin(dlon/2))^2$$
$$c = 2 * \arcsin(\min(1, sqrt(a)))$$
$$\textbf{distance = (Earth Radius) * c}$$

RELIABILITY DETERMINATION OF LOCATION UPDATES IN MULTIPATH ENVIRONMENTS

CROSS REFERENCE TO RELATED APPLICATIONS

This application is a 35 U.S.C. 371 national stage filing of International Application No. PCT/AU2017/000196, filed on Sep. 13, 2007 which claims the benefit of Australian Patent Application No. 2016903679 filed on Sep. 13, 2016, the disclosures of which are incorporated herein by reference.

FIELD

The field of the disclosure in this specification is location determination and in particular location determination of mobile devices in radio frequency multipath environments.

BACKGROUND

When establishing the location and the continuous travel path of a computational device using a satellite based global positioning system, of which GPS is but one example. The process of establishing the location of such a device is influenced by a range of factors that can cause significant errors in the location determination process. One of the most significant causes of such errors is multipath reception issues.

The process of calculating the position of the device can use the positioning techniques available to a global positioning system including the satellites which generate signals and the device which receives and processes those signals. In one example carrier-phase measurement indicative of the time of transit from multiple transmitter sources is useable as part of the process of calculating the position of the device. Since in a global positioning system there are multiple satellites each housing a transmitter, the mobile devices' position is partly established in the process by simultaneously receiving a carrier signal from at least three satellites preferably by way of a direct radio frequency link (often referred to as direct 'line of sight' communications). Each satellite is orbiting the earth, and any time the satellite knows its location relative the earth (typically a slightly idealised version suitable for calculation purposes) and thus 'in line of sight' to the receiving device. In some situations along with a fourth satellite providing, in an ideal situation, a further radio frequency signal to establish the devices' location in 3d space (the fourth satellite reception is necessary to perform, in one arrangement, a least squares calculation of distance and altitude. As mentioned the process is not solely based on distance measurements but timing and data modulated on to the various carrier signals, therefore the absence of a highly accurate clock base as is the case for most land based and typically mobile receivers. The use of carrier-phase and respective transit time, internal clocks and radio frequencies to communicate the relevant information from the satellite and be reliably received by the typically very compact receivers associated with the computational device, is fundamental to the determination of the position of the mobile device with respect to an agreed datum. It follows that the greater number of satellites being simultaneously received the higher the assurance that the calculated location is accurate and the level of confidence ascribed to that determination, the depiction in FIG. 1 is illustrative of such a situation.

A position is expressed using the WGS (World Geodetic System) 84 standard. WGS is used to express locations within a global positioning system and all common mobile computer devices (including smartphone) platforms having a position determination capability. Some position determination quantification standards exist that do not fall under WGS 84 such as ED50, ETRS89, GRS 80, NAD 83, DAVD88, SAD69, SRID and UTM. The use of a standard ensures that all manufacturers that design location determination devices, including GPS devices, and that use the output from such devices can readily generate GPS data that will be accepted by users (computer programs) of that GPS data to add value to the position determinations provided.

Using the carrier signal from each of the available 'line of sight' satellites, a land/sea based receiver detects the respective signals and by using at least four distinct received satellite signals, the receiver's location can be calculated. The calculation of location is based on a carrier-phase measurement indicative of the time it takes each signal to reach the receiver. The calculation includes the exact position of the transmitting satellite in orbit is communicated with the signal and includes ephemeris data used to calculate the position of each other satellite in orbit as well as information about the time and status of the entire satellite constellation is available in an almanack. To eliminate or minimize error requires that the signals detected are transmitted via a direct line of sight from each of the satellites to the receiver. If one or more of the signals are not received directly, but rather reflected off a surrounding surface or structure, the calculation of the receivers' location is inevitably incorrect due to the additional time it takes the signal to be received compared to the time taken by a direct line of sight signal. In effect, the quasi-random effect of multiple paths of the carrier signal cannot be differenced away like residual clock error at either or both the transmitter and receiver. Multipath conditions are not capable of being corrected only with calculation based treatment of the determined positions. Furthermore, it is difficult to differentiate which signals from which satellite are; direct line of sight, or, those which are reflected of which there can be multiple instances of the same signal. Thus, sometimes there will be the intractable task of determining which signals are the same signal from the same satellite received directly or with a delay caused by reflection.

When many radio signal reflective surfaces exist, and a direct line of sight between the device and surrounding satellites is hard or impossible to achieve, any consequent location determination reliant on those signals may or will include errors sometimes large and sometimes small. Most receivers have methods which create a measure of the accuracy of each position determination. By way of illustration, civilian GPS can provide an accuracy of 7.8 meters at 95% confidence level when measuring the distance between a receiver and satellite.

Higher accuracy is attainable by using GPS in combination with augmentation mechanisms such as WiFi, cell tower triangulation, etc., but even in these cases, reflections can be evident. Thus even in an otherwise ideal situation the outcome of any uncertainty caused by reflections can create uncertainty in both precision and accuracy, as exemplified by comparing the results from many epochs of data, the coordinate position values agree amongst themselves quite closely; they have high precision. However, due to some remaining bias, they are offset from the true value; their accuracy is low, and this illustrates that even in ideal circumstances two different but complementary measures for assessing the quality of the results exist. Once enough GPS signal accumulates, a normal distribution will form. Then, tools like Gauss's normal curve error model and the associated square root law can be brought to bear to estimate any measurement error to indicate the confidence of the position determination being both precise and accurate.

However, over short periods of time, data may not be normally distributed and in many respects that can be the case for environments that engender multipath reception.

An example of an environment in which multipath errors are typical, including what is termed urban canyons. Urban canyons exist in high rise building areas where most location aware mobile devices are used and mostly those mobile devices are at street level surrounded fully, or partly, by tall multi-storey structures. Those devices will have a limited direct radio frequency line of sight to and from one or more satellites transmitting the required signals. In such cases, it is more probable than not, that radio frequency signals from satellites will be reflected once or more times before being received at the mobile device. It is those signals that the receiving device has to use to determine its location. It should be noted that natural geographic canyons exhibit the same or similar effects on radio frequency reception by mobile position aware devices which use a global positioning system. FIG. 2 is illustrative of one satellite being received multiple times by the same land based receiver. FIG. 3 is illustrative of a mobile device located in a canyon environment and illustrates multiple paths of signals from two satellites received by the land based receiver in the mobile device.

It should also be noted that canyons are not the only cause of multipath propagation since atmospheric ducting, ionospheric reflection, refraction and reflection from water bodies can also contribute. Further, human bodies and radio opaque objects can block or attenuate, direct and even reflect signals. Therefore, there are many natural and human made causes of signal differentiation, which can make location determination difficult or increase the probability of error associated with any position determination provided by a location aware mobile computer device.

In practical terms when successive location determinations are displayed to a user of such a mobile computing device, and signal differentiation is an issue, the displayed location is observed to jump from one location to a distant other location seemingly instantaneously. The apparent movement represented as many meters or even hundreds of meters away, or appear in a location that is not possible in the circumstance, such as inside a building or over water when the user is walking in the street. The user learns to filter out the most outlying displayed locations but the manner of such error, being one which is generated apparently randomly, can be subtle (creeping) and also misleading (showing movement when in fact the device is stationary).

Importantly to the software applications loaded or used by the location aware mobile computer device, the described circumstances which result in the receipt of multipath signals, will affect the usefulness of geo-fence monitoring and will also affect track logging and speed determinations. In the latter case, it could be that a vehicle is tracked as being over the speed limit over two or more position determinations when the vehicle was, in fact, travelling at or below the speed limit but through a canyon region. It could also be that a person or vehicle associated with a mobile computing device is deemed to be within or has passed through a geo-fenced region when that did not actually happen. There may be legal or monetary consequences of that deemed location determination that has resulted from a location update or sequential updates to the location aware device which is incorrect and is therefore unreliable for use by the user or the location dependent applications used by the location aware mobile computer device.

A method and approach is disclosed which assists the process of position determination when being used in a mobile computing device and the position information provided to the user of such a mobile computing device and useable to determine the position of the device with respect to actual locations or in relation to geo-fenced regions or lines.

BRIEF DESCRIPTION OF ASPECTS

In an aspect there is a method of determining the unreliability of a location determination of a device knowing at least the prior determined location and time of determining the location of the device, comprising the steps: a) determining a first location of the device, the time of the first location determination, the speed of the device, and the bearing of the path of the device, using at least the prior determined location and time of the prior determination of the device; b) determining a second location of the device, the time of the second location determination and the time period between the determination of the first and second location determinations; c) determining for the second location of the device at least one of the group of characteristics of the device: speed of the device; distance difference between the first location and the second location of the device; acceleration of the device being the rate of change of the speed between the first location and the second location of the device; bearing of the path of the device between the first location and the second of location of the device; d) determining that the second location determination of the device is unreliable if one or more of the following conditions are true: the speed of the device at the second location is greater than a predetermined speed; the distance difference between the first location and the second location of the device is greater than a predetermined distance; the acceleration of the device is greater than a predetermined rate of change of the speed between the first location and the second location of the device; the difference in, the bearing of the path of the device between the prior location and the first location, and the bearing of the path of the device between first location and the second location, is greater than a predetermined angle in any plane; or the time period, between the determination of the first location of the device and the determination of the second location of the device, is greater than a predetermined period.

In an aspect there is a method of determining the unreliability of a location determination of a device if one or more of the following conditions are true: the speed of the device at a location is greater than a predetermined speed; or the distance difference between a first location determination and a second location determination of the device is greater than a predetermined distance; or the acceleration of the device is greater than a predetermined rate of change of the speed between the a-location determination and a second location determination of the device; or the difference in, the bearing of the path of the device to a first location, and the bearing of the path of the device away from the first location to a second location, is greater than a predetermined angle in any plane; or the period, between the determination of a first location of the device and the determination of a second location of the device, is greater than a predetermined period.

"Software," as used herein, includes but is not limited to one or more computer readable and executable instructions that cause a computer or other electronic device to perform functions, actions, and behave in a desired manner. The instructions may be embodied in various forms such as routines, modules, or programs including separate applications or code from dynamically linked libraries. The software may also be implemented in various forms such as a stand-alone program, a function call, a servlet, an applet, and an application, instructions stored in a memory, part of an operating system or another type of executable instructions. It will be appreciated by one of ordinary skill in the art that the form of software is dependent on, for example, requirements of the desired application, the environment it runs on, and the desires of a designer/programmer or the like.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and method steps described in connection with the embodiments disclosed herein may be implemented as electronic hardware, computer software, or combinations of both. To illustrate this interchangeability of hardware and software, various illustrative components, blocks, modules, circuits, and steps have been described above generally regarding their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside on any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

A detailed description of one or more preferred embodiments is provided below along with accompanying figures that illustrate by way of example the implementation of those embodiments. On the contrary, the scope of the disclosure is limited only by the appended claims and the disclosures encompass numerous alternatives, modifications, and equivalents. For example, numerous specific details are outlined in the following description to provide a thorough understanding of the presented implementations. The present disclosures may be practiced according to the claims without some or all of these specific details. For clarity, technical material that is known in the respective technical fields has not been described in detail so that the present disclosure is not unnecessarily obscured.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgement or any form of suggestion that such background or prior art forms part of the common general knowledge.

Suggestions and descriptions of other embodiments may be included within the disclosure but they may not be illustrated in the accompanying figures or features of the disclosure may be shown in the figures but not described in the specification.

The terms location and position are used almost interchangeably within this document and when required to determine the meaning of those terms the context of their use will assist but there is not meant to be any practical difference in their meaning.

DETAILED DESCRIPTION OF EMBODIMENTS

Figure 1:
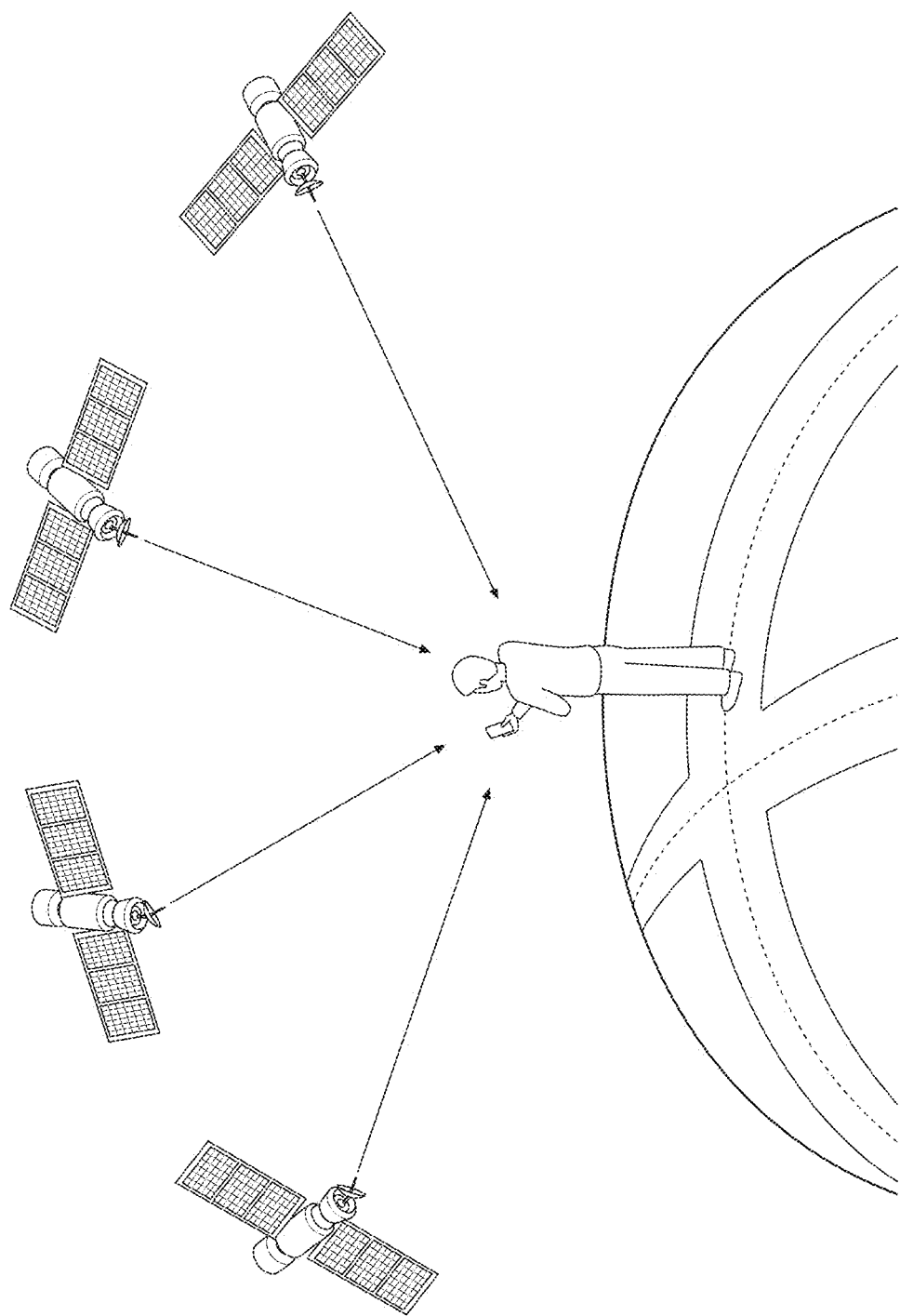
FIG. 1 depicts four satellites being directly received by a mobile device.
Figure 2:
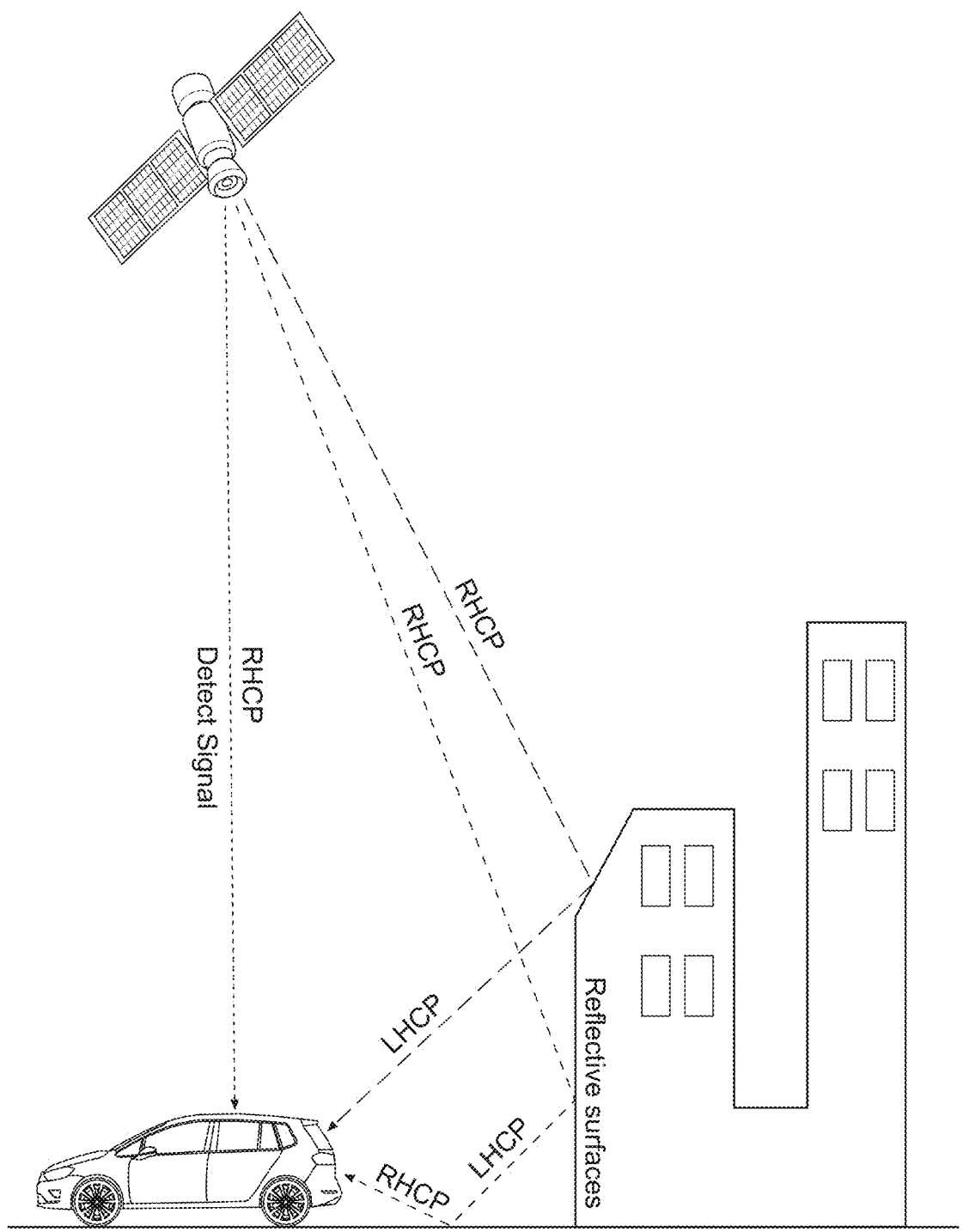
FIG. 2 depicts an example of a mobile device located in a canyon environment and illustrates multiple paths of signals received by a mobile device from a single satellite.
Figure 3:
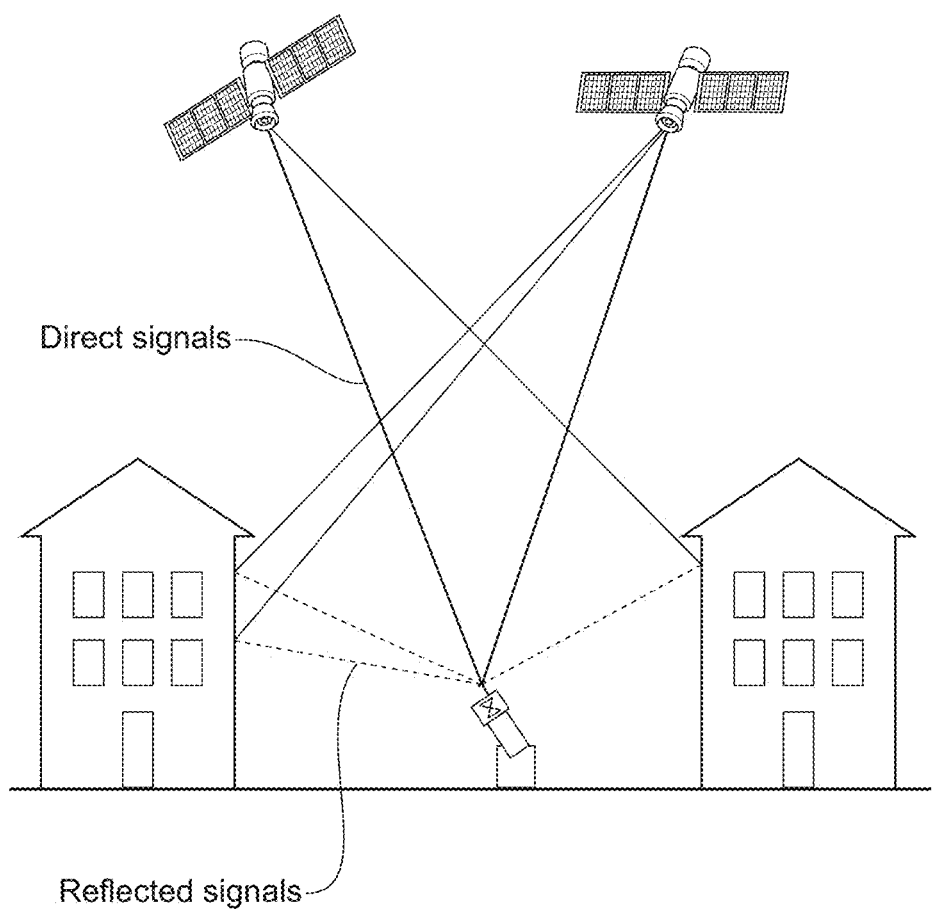
FIG. 3 depicts an example of a mobile device located in a canyon environment and illustrates multiple paths of signals received by a mobile device from two satellites.

When referring to a device having location determination techniques and associated hardware it would be typical that the device is a smartphone (this term is used in this specification, but the term is used to exemplify a device commonly used to provide positioning related functionality). However, any device having a power supply, computational abilities, and at least one and preferably more location determination techniques available to it with their applicable predetermined accuracies is intended to be covered. So that by way of example, the device may be installed or associated with a transportable container; the device may be part of a vehicle; the device may be part of a machine; the device may be connectable to the above or may be a small part of a larger arrangement. Wherein the location determination techniques are a combination of hardware and software or software alone which uses internal and external signal sources some carrying data to perform a location determination.

In one embodiment, the method uses capabilities within the smart phone or other computer devices to determine a devices' location within a reference model, typically used to associate the determined position with a location or geographical area on a map.

It may be that there is more than one location determination application/device/mechanism available to the mobile device and each one, is used alone, or in-turn or a combination of them is used effectively simultaneously, to determine the location of the device. Known errors of the position determination of each technique can be used such that the most precise location determination mechanism is used the most reliable location determination or a combination/fusion of the results is used to determine the location of the device.

The determination of the distance a mobile device is away from a location or area is performed as a consequence of the device first determining its position using one of the available location determination techniques, then the device calculating the distance away the from the predetermined location or area. In many cases, the location determination is used to display that location on a map of the area in which the mobile device is situated, but there is a multitude of uses of that distance information which may be but one data point in a complex set of data needed to perform a particular function.

Various location determination techniques are available to a device, but each of them has different known accuracies. For example, GPS can have accuracy down to meters in ideal circumstances.

In another example, WiFi based determination accuracy can be dependent on the signal strength at the time of the determination. There can be other factors such as the number of WiFi devices in the area, and whether they are matched in an accessible database to a known geographic coordinate according to a known datum and hence the accuracy of determination may range from meters to tens of meters.

The technologies used for location determination of a device may include, the Global Positioning System (GPS), sector (telephony base station) position determination using, for example, IposDet (on CDMA networks), cellular tower (Cell ID). Also, Wi-Fi (802.XX) access points which rely on the transmission of unique identifiers and related known location data to permit the triangulation of the receiving device. The use of technologies such as these can, by themselves, allow for position determination despite the occasional unreliability of one or more of them in different environmental and physical locations of the device.

It is a further application of the available features of a smart phone or other computer device having location determination capability that the location determination is related to a certain action that the device is to perform. The relation can be as a result of the presence of the mobile device at a predetermined location or within an area about the predetermined location or even cross a virtual boundary line.

The manner in which a device provides position can depend on the technology that is used to derive that location. Location in this disclosure is expressed using the WGS (world geodetic system) 84 standard but that is merely a choice, and use of the principles disclosed herein is possible when using other standards or cartographic models.

In an ideal GPS assisted mobile location determination environment, at least four but possibly up to 8 satellites can be simultaneously received by the mobile device. FIG. 1 depicts four satellites that are directly received by a mobile device in which case there is likely to be both precision and accuracy in the determination of the position of the mobile device.

As with all real world systems, there is an error which needs to be accounted for, and accuracy is affected. By way of explanation without providing more of the relevant details. GPS error analysis examines the sources of errors in GPS results and the expected size of those errors. GPS makes corrections for receiver clock errors and other effects, but there are still residual errors which are not always corrected or correctable. Sources of error include: signal arrival time measurements (the main issue when the device is located within an urban canyon); numerical calculations; atmospheric effects; ephemeris and clock data; multipath signals (another way to express differences in arrival time but also to identify that sometimes the same signal can arrive at different times because of the reflections); and natural and artificial interference. The magnitude of the residual errors resulting from these sources is dependent on the geometric dilution of precision.

Thus when the term "position determination" or "location determination" is used, the actual manner in which location is presented as a location update (LU), and made available, is wholly dependent on the position determination technique used to determine that location. Further, there will be a known accuracy of determination which itself may be dependent on the application of the respective technique to the circumstances of the position determination and which may apply to the determination only at the time of the determination and updated with future determinations. For example, a GPS position determination can have a range of accuracies, mostly dependent on the number of satellites that are available from which to derive the location of the device complicated by one or more of the errors noted above.

In order to minimize the errors that occur as a result of multipath reception and circumvent the restriction in differentiating genuine line of sight signals from reflected ones, it is proposed to utilize an approach which compares successive position determinations and test predetermined characteristics of each determination to assess the relevance of a subsequent determination to a prior determination. This process will operate independently of the accuracy determinations associated with the location determination technique used by the mobile device.

The use of successive location determinations can include all Location Updates (LUs) made available by the position determination mechanism, or selected of those LUs, in one example every second LU, or LUs separated by a period say 0.1 second. It is also possible to apply the methods disclosed herein over past LUs so as to identify past erroneous LUs and once identified to determine where the LU should or was more likely to be actually located.

In an aspect the method of determining the unreliability of a location determination of a device if one or more of the following conditions are true. The number and type of conditions is a matter of considering the following examples. The speed of the device at a location is greater than a predetermined speed; the distance difference between a first location determination and a second location determination of the device is greater than a predetermined distance; the acceleration of the device is greater than a predetermined the rate of change of the speed between the a location determination and a second location determination of the device; the difference in, the bearing of the path of the device to a first location, and the bearing of the path of the device away from the first location to a second location, is greater than a predetermined angle in any plane; the period, between the determination of a first location of the device and the determination of a second location of the device, is greater than a predetermined period. In these examples, the successive LUs and the actual speed, distance, accelerations and period is a matter of experimentation and reasonable calculation, as well as the use of a weighting of one or more of the conditions depending on the use of the device or the prior movement history of the device.

Figures 28, 29:
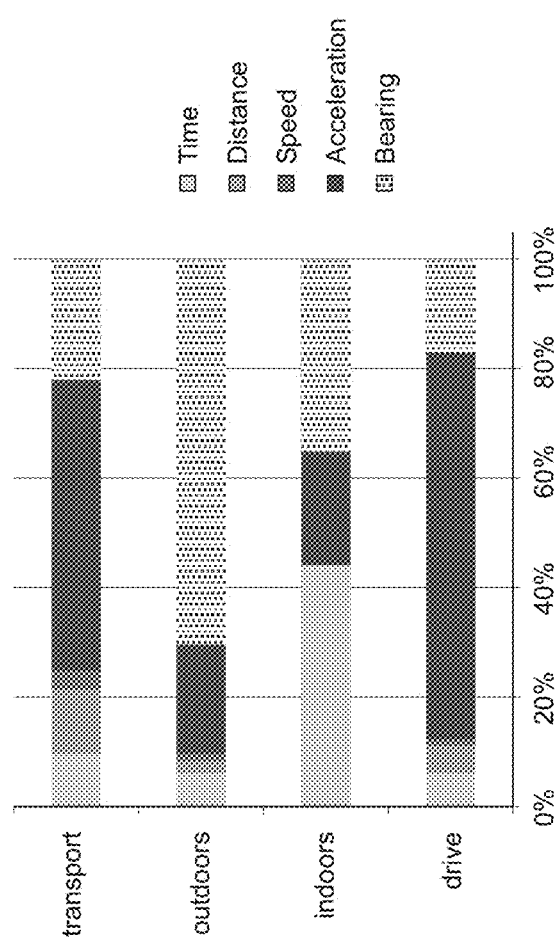
FIG. 29 is the result of an analysis of stored LUs to quantify the significance of the reduction in erroneous LUs and thus circumvent the restriction in differentiating genuine line of sight signals from reflected signals.

For each further location update generated by, in this example a GPS receiver, the above process steps can be repeated indefinitely. The result of this methodology can be a reduction in the number of erroneous location updates (bounces) established via GPS due to multipath reception in urban canyon and other environments. An analysis of historical LU data is illustrative of the reduction as depicted in FIG. 29, and particularly the bounce statistics. The location updates can be generated by other position determination techniques as well, and there can be arrangements where the location update is the result of a fusion of two or more position location techniques.

The most widely used position location technique is that generated from a GPS receiver and the GPS data generated can be made available (sometimes for display) in different message formats to a computer device. There are standard and non-standard (proprietary) message formats. Nearly all GPS receivers output NMEA data. NMEA 0183 is the current format, as of the writing of this specification, combined electrical and data specification for communication between marine electronics devices such as echo sounder, sonars, anemometer, gyrocompass, autopilot, GPS receivers and many other types of instruments. The NMEA standard is formatted in lines of data called sentences. Each sentence contains various bits of data organized in comma delimited format (i.e. data is separated by commas). An example NMEA sentence from a GPS receiver with satellite lock (4+ satellites, accurate position):
COPY CODE$GPRMC,235316.000,A,4003.9040,N, 10512.5792,W,0.09,144.75,141112,,*19 $GPGGA, 235317.000,4003.9039,N,10512.5793,W,1,08,1.6,1577.9, M,−20.7,M,,0000*5F $GPGSA,A,3,22,18,21,06,03,09,24, 15,,,,,2.5,1.6,1.9*3E For example, the GPGGA sentence contains the following information:

Time: 235317.000 is 23:53 and 17.000 seconds in Greenwich Meant Time

Longitude: 4003.9040,N is latitude in degrees. decimal minutes, North

Latitude: 10512.5792.W is longitude in degrees. decimal minutes, West

Number of satellites seen: 08

Altitude: 1577 meters

The data is separated by commas to make it easier to read and parse (read and separate the data) by computers and microcontrollers. This data can be sent out of the GPS chip or circuit on a serial port at an interval called the update rate. Most GPS receivers update this information once per second (1 Hz), but more advanced receivers are capable of generating multiple updates per second. 5 to 20 Hz is possible.

It is the Latitude and Longitude, and if the calculation accommodates it, the altitude information, used in the general method described.

Figure 4:
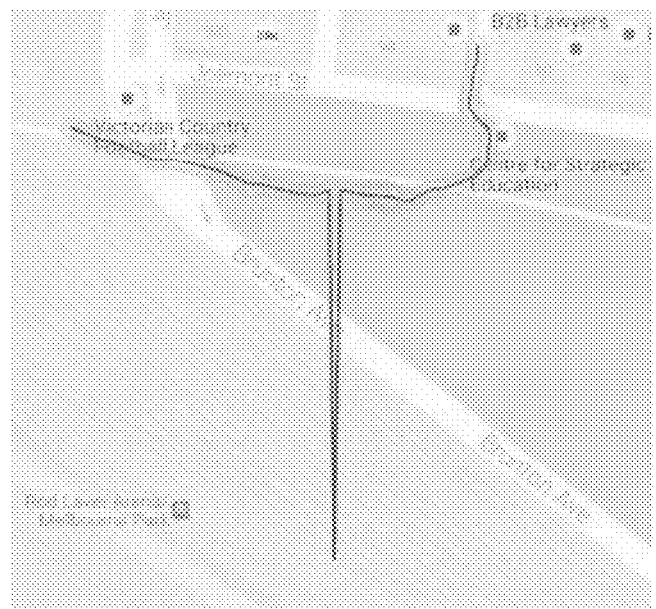
FIG. 4 depicts a mapped illustration of an apparently unreliable location determination by a moving mobile device performing Location Updates (LUs)

FIG. 4 depicts a mapped illustration of an apparently unreliable location determination by a moving mobile device performing location updates (LUs). The tracked path (dotted line) depicts the result of successive LUs. Each LU depicted as a circle about the determined location is illustrative of the attendant error of determination, but at about the mid-path of the tracked path depicted, the dotted line diverts dramatically from the nominal path for one LU which is well away from the expected location determination. The cause of an errant LU could be one of many and likely indeterminate. However, the occurrence still needs to be assessed and dealt with by the application using the location determination (which may be the relatively simple task of showing or tracking the path taken or a more involved task of determining the location relative to a geo-fenced location or region for commercial purposes). This type of errant LU event is called a 'bounce'. The latest clock, orbit, and atmospheric models have improved ranging accuracy, leaving receiver-dependent multipath and front-end-noise-induced variations as the dominant sources of error in the location determination of current consumer devices using GPS as the primary locations determination technique. So not only is accuracy still an issue, the reliability or not of LUs can now be assessed with the methods disclosed herein.

Figure 5:
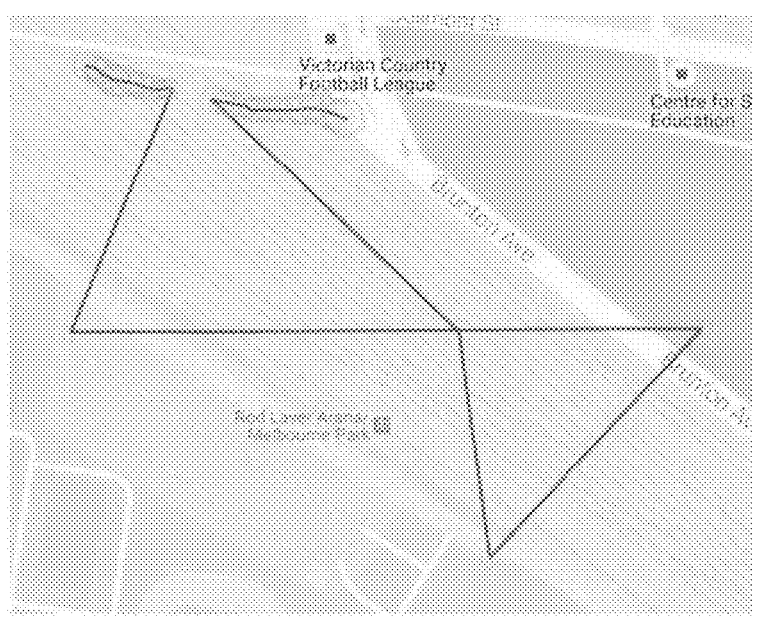
FIG. 5 depicts a mapped illustration of a sequential series of apparently unreliable location determinations by a moving mobile device performing LUs.

In an embodiment, a filter is used to identify and dismiss the use of one or more unreliable (apparently errant) LUs. FIG. 5 depicts a mapped illustration of a sequential series of apparently unreliable location determinations by a moving mobile device performing location updates (LUs), in much the same environment as depicted in FIG. 4. In this example, there are five LUs that when mapped appear unreliable. These LUs are consecutive, so it can be more difficult to determine whether they are unreliable, but it is also important that the assessment of that unreliability is timely and does not over tax the available processing power. Further more these LUs can be used in a mobile environment such that the time-to-ambiguity resolution which can take many seconds is not available, regardless of the use of code-phase positioning techniques or carrier phase differential techniques with appropriate receivers of the global navigational satellite system.

If there are two consecutive Location Updates given; LU1 and LU2; a set of derivative parameters is calculated for LU2 (relative to LU1):
  time—time difference between LU2 and LU1 (easily derivable since time is a data value integral to all location determinations especially GPS techniques)
  distance—distance travelled
  speed—speed of movement
  acceleration—change of speed since LU1 (assuming LU1 has a known speed)
  bearing—bearing of the movement vector.

Figures 6, 7:
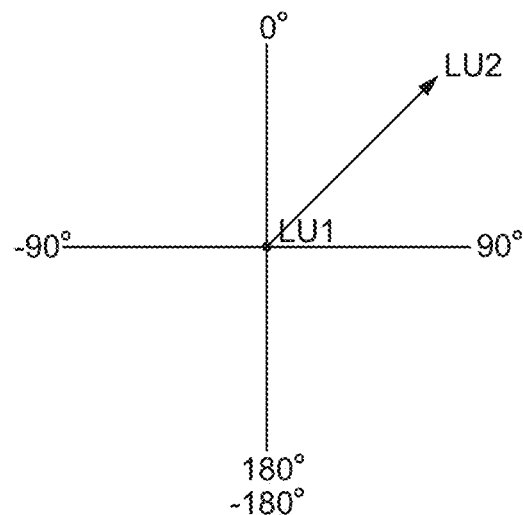
FIG. 6 depicts a graphical representation of the bearing coordinates related to two consecutive location updates LU1 and LU2.
FIG. 7 depicts a table of parameters and location update types as determined by the moving mobile device.

FIG. 6 depicts the use of a vector illustration to represent the magnitude and direction of movement represented by the relative location of LU1 to consecutive LU being LU2. The vector representation is but one form of the value of the bearing of a path between two known points, in this arrangement, two location determinations in at least the same two dimensions but typically three, all within a common datum.

A mobile computer device (typically but not necessarily in the possession of a user and which could also be part of a transportation monitoring device such as a container on a moving truck or ship or train) is considered "standing still" if both speeds<=STANDING_STILL_SPEED_m_s=1.0 and travelled distance<=STANDING_STILL_DISTANCE_m=0.3. For such updates LU2 is considered having no bearing (bearing=UNINITIALISED_BEARING_d=−1000.0).

Thus, determining whether an LU is a reliable LU is based on a comparison of the LUs and one or more conditions, referred to herein as derivative parameters. Knowing at least the prior determined location and time of determining the location of the device although as will be explained there can also be recognition that certain parameters can be uninitialized for a first LU or initially received LUs.

In an embodiment, a method where there is already knowledge of at least the location and time of determination of the prior location then steps can comprise: determining of a first location of the device, the time of the first location determination, the speed of the device, and the bearing of the path of the device, using at least the prior determined location and time of the prior determination of the device (the determination being part of the operation of a location determination technique available to the processor and memory of a computer device). Determining a second location of the device, the time of the second location determination and the time period between the determination of the first and second location determinations (the determination also being part of the operation of a location determination technique available to the processor and memory of a computer device). Determining for the second location of the device at least one of the group of characteristics of the device:
  i. speed of the device;
  ii. distance difference between the first location and the second location of the device;
  iii. acceleration of the device being the rate of change of the speed between the first location and the second location of the device;
  iv. bearing of the path of the device between the first location and the second of location of the device.

The determination also being part of the operation of the processor and memory of a computer device, wherein the speed of the device being determined from the calculation of the distance between the first location determination and the second location determination divided by the time period between the two successive location determinations. There are many alternative speed determination techniques.

A distance determination between the first location and the second location of the device it is possible to calculate the distance by performing a simple point to point calculation (in 3-dimensional spaces).

LU can be reliable only in relation to some other LU. For example; LU2 is reliable to LU1 if all conditions are met: (the following being an example only)
  LU2.time<=DEFAULT_TIME_s=15.0
  LU2.distance<=DEFAULT_DISTANCE_m=77.0;
  LU2.speed<=DEFAULT_SPEED_m_s=41.66;   //150 km/h
  LU1.acceleration is UNINITIALISED_ACCELERATION_m_s_s or Math.abs(LU2.acceleration)<=DEFAULT_ACCELERATION_m_s_s=4.4704*1.5;
    //1.5*Fast car: 0-60=6 sec; 10 mi/(h·s)=4.4704 m/s2
  any of LU1 or LU2 bearings are UNINITALISED_BEARING_d OR bearing difference between LU2 and LU1<=DEFAULT_BEARING_d=90.0

For example, the very large km/hr equivalents of the speed and distance (at a 1 Hz LU update rate) are unlikely to be exceeded by a vehicular transport (except a train (in particular a high-speed train)), and the acceleration is unlikely to be exceeded by most forms of transport, and a bearing difference of greater than 90 degrees within a period determined by a 1 Hz LU update rate is unlikely in a transportation environment. However, if the application knows the prior speed and acceleration (say associated with a device being transported by a person walking about a city), then the various values can be adjusted to reflect a narrower field of parameters so that errant LU determination is more likely to be determined. There is as can be observed a balance between determining errant LUs and false positives.

If any of the conditions are not met (that is the condition is true); LU is deemed to be unreliable or a bounce. The expressions 'true' and 'false' are relative to the format of the stated condition, so another way of expressing the conditions (the following being an example only)

i. the speed of the device at the second location is greater than a predetermined speed;
ii. the distance difference between the first location and the second location of the device is greater than a predetermined distance;
iii. the acceleration of the device is greater than a predetermined the rate of change of the speed between the first location and the second location of the device;
iv. the difference in the bearing of the path of the device between the prior location and the first location, and the bearing of the path of the device between the first location and the second location, is greater than a predetermined angle in any plane; or
v. the time period, between the determination of the first location of the device and the determination of the second location of the device, is greater than a predetermined period.

Wherein, determining that the second location determination of the device is unreliable if one or more of the following conditions are true:

i. the predetermined speed (distance per second) is 41.66 meters per second;
ii. the predetermined distance is 77 meters;
iii. the predetermined acceleration is 6.7056 meters per second per second;
iv. the predetermined difference in bearing is 90 degrees;
v. the predetermined period is 15 seconds.

The determination of the various values for speed, distance, acceleration, the difference in bearing, the stationary period is a matter of experimentation and may be varied if the use to which the device and the application running on that device is of a particular type.

The derivative parameters are called derivative for a reason and are progressing in an example where the prior location and other characteristic are unknown or not available thru lifecycle from UNINITALISED_to real value.

FIG. 7 presents the outcome of the application of a filter to successive LUs LU1 to LU4 illustrating the particular embodiment where there needs to be some initialization with regards the first time an LU is dealt with by a filter such as the one described above. Once the number of filtered LUs exceeds two, some parameters can resolve that an LU is reliable, such as time, distance and bearing, but it will take at least three LUs to determine the reliability of the third LU if the filter parameter is acceleration, and by the time four LUs are provided all the parameters can be used to determine reliability. The example above is premised on there being an LU of known location and time at least preceding the first location determination, as that is the condition for a real time application most of the time the method is applied to LUs as they are determined and the preference for knowing whether it is a reliable LU or not.

Figure 8:
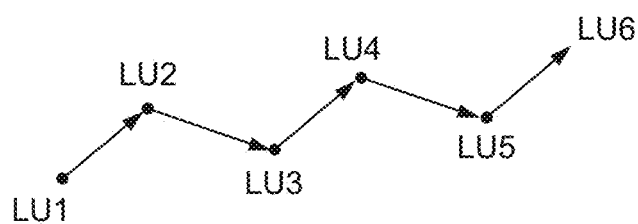
FIG. 8 depicts an illustration of a reliable track consisting of reliable location updates LU1 to LU6.

Thus a reliable track is depicted in FIG. 8 being LUs LU1 to LU6.

To emphasize the way in which initial tracking, in an embodiment, is dealt with, Track composition can be expressed in the form of pseudo-code as follows:

if currentLocationUpdate is reliable to previousLocationUpdate
  then currentLocationUpdate=reliable
  else then currentLocationUpdate=bounce The first LU of the reliable track, Track 1 is a bounce because it is processed and considered non-reliable as there are no prior LUs and thus it is assumed to be a bounce. A location determination can be deemed to be uninitialized if there is no prior location determination or the prior location determination does not meet a predetermined criteria, such as by way of example the determined location is greater than a predetermined distance from the first LU. Much the same criteria as previously disclosed applies to the determination of the predetermined distance and other criteria.

Figure 9:
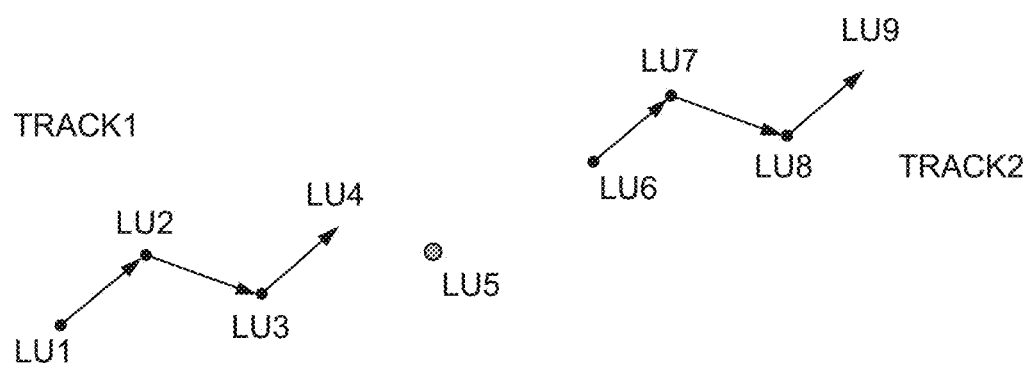
FIG. 9 depicts an illustration of two disconnected reliable tracks, track 1 (LU1 to LU4) and track 2 (LU6 to LU9) and intermediate those tracks an unreliable location update LU5.

Referring to FIG. 9 which is an illustration of an event much like that depicted in FIG. 4, this embodiment deals with what is termed a missed triggers analysis, performed on top of the Reliable Track Composite Filter processed data (as disclosed above) and is done using as a basis for that processing, the concept of Interruption and Interrupting Bounce events.

In FIG. 9 LU5 is an Interrupting Bounce causing an Interruption. If LU5 were not filtered out, the LU could be interpreted by the application using LUs to mean something other than what is, in reality, the case, such as, that the device has entered a geo-fenced area (not shown) and that could trigger a response by the geo-fence application. In one example, the entry into a geo-fenced area could trigger the application to charge the user of the device for entering a closed concert area, even though the user did not enter that area and thus should not be charged the entrance fee.

There are other unwanted consequences of an Interupting Bounce and Interuption. For example, when the entry into an area (relatively small area) whether while walking or while in a vehicle that the entry to and exit from that area is not determined, because the Interrupting Bounce is an instance where the Reliable Track Composite Filter determines that the LU is unreliable so the actual location is then unknown and the event of entering and leaving a geo-fenced area (generally a small one) is missed.

The conditions to determine the Interrupting Bounce and Interruption can be a variety of parameters, some of which are described below.

Figure 10:
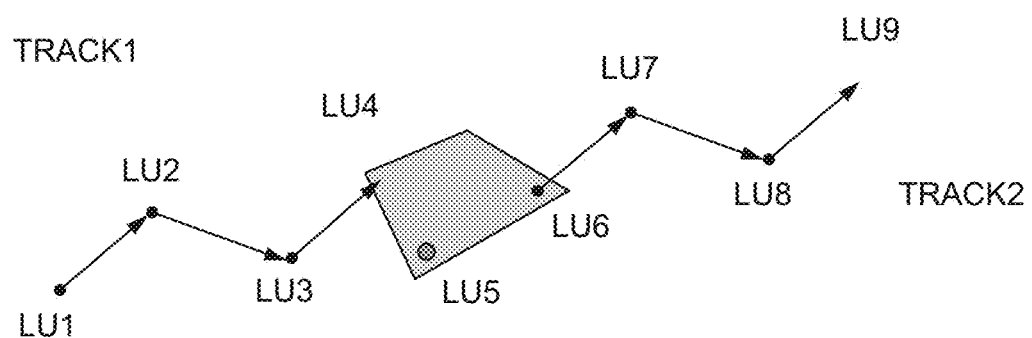
FIG. 10 depicts an illustration of a two disconnected reliable tracks, track 1 (LU1 to LU4) and track 2 (LU6 to LU9) and a possible condition which determines that the intermediate LU5 enters a geo-fenced area as also illustrated in FIG. 12.

The distance between end of last track and start of next track is >AVERAGE_FENCE_SIZE_m=20.0. Otherwise the geo-fenced will be entered by either of the tracks, in the example illustrated in FIG. 10 LU4 or LU5. These parameters are provided for illustration purposes only.

Figure 11:
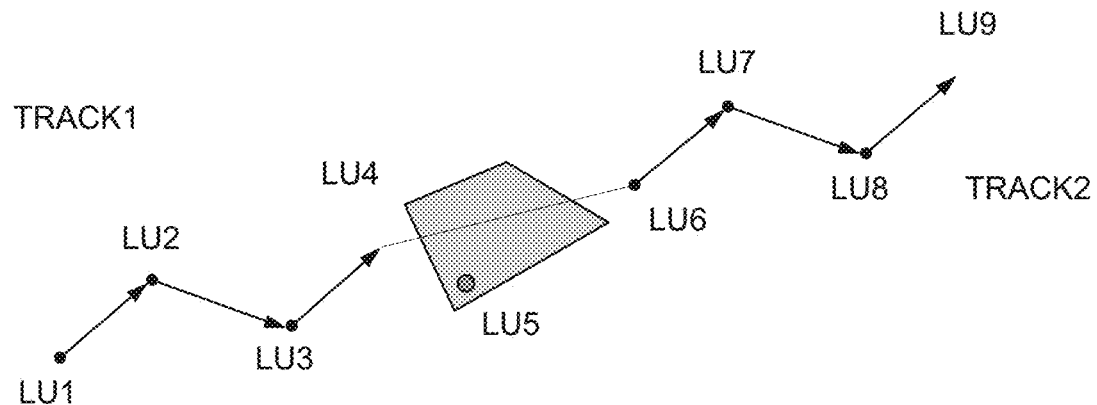
FIG. 11 depicts an illustration of a two disconnected reliable tracks, track 1 (LU1 to LU4) and track 2 (LU6 to LU9) and a reconnection of the reliable LUs.

In an illustrative example, the time between end of last track and start of next track is >GPS_SIGNAL_LOST_TIMEOUT_ms=20*1000. In an embodiment the implementation is performing a likely path analysis to generate a path between the previous reliable LU (LU4 and the next reliable LU (LU6) basically reconnecting reliable LUs which have a time difference below 20 seconds as illustrated in FIG. 11 which avoids the condition which would have determined that the intermediate LU5 entered a geo-fenced area, this application providing an example only of the use of the processes disclosed herein.

The knowledge that there are unreliable LUs and then what to do about the missed LUs provides various possibilities. For example, creating a likely path between reliable LUs; using the likely path to map the movement; use the past LU history to determine whether there were other unreliable LUs, and then determine whether any of those that were missed could have been related to a geo-fence or other location dependent application being used by the mobile device. Such an occurrence is referred to as a missed trigger analysis and recovery of at least some of the missed LUs allows them to be appropriately dealt with by the application. In one example, the quantity of missed triggers and bounces are as illustrated in FIG. 29.

Figure 12:
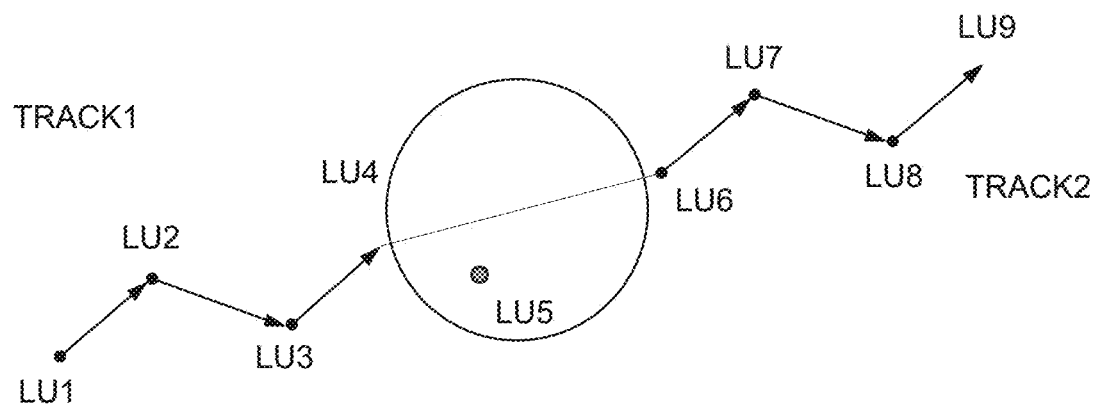
FIG. 12 depicts the LU5 positioning within a circular geo-fenced area.

A bounce event inside the likely geo-fenced area, in this example, a circle is as illustrated in FIG. 12. The likely geo-fence circle is located in the geometric centre of "end of last track" to "start of next track" line; which is LU4 to LU6 as depicted in FIG. 12. The radius of this circular geo-fenced area is LU4 to LU6 distance/2 minus AVERAGE_FENCE_SIZE_m=20.0. Again the parameters used are for illustration purposes.

Figure 13:
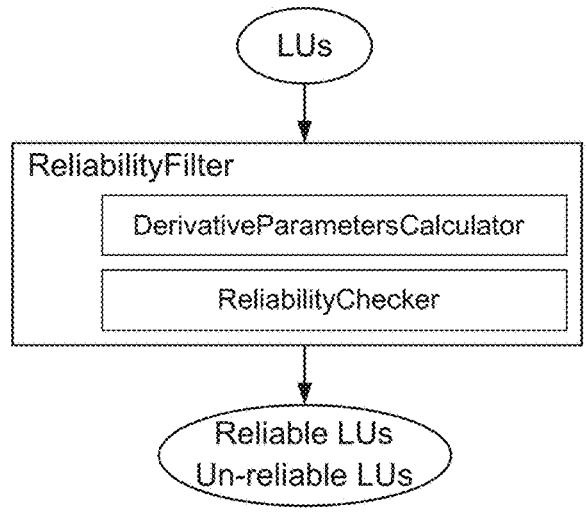
FIG. 13 depicts a model for processing LUs to determine reliable and unreliable LUs.

FIG. 13 depicts a high-level model for processing LUs to determine reliable and unreliable LUs, comprising an input comprising successive LUs into a reliability filter having a derivative parameters calculator and a reliability checker having an output of whether an LU is reliable or unreliable.

Figure 14:
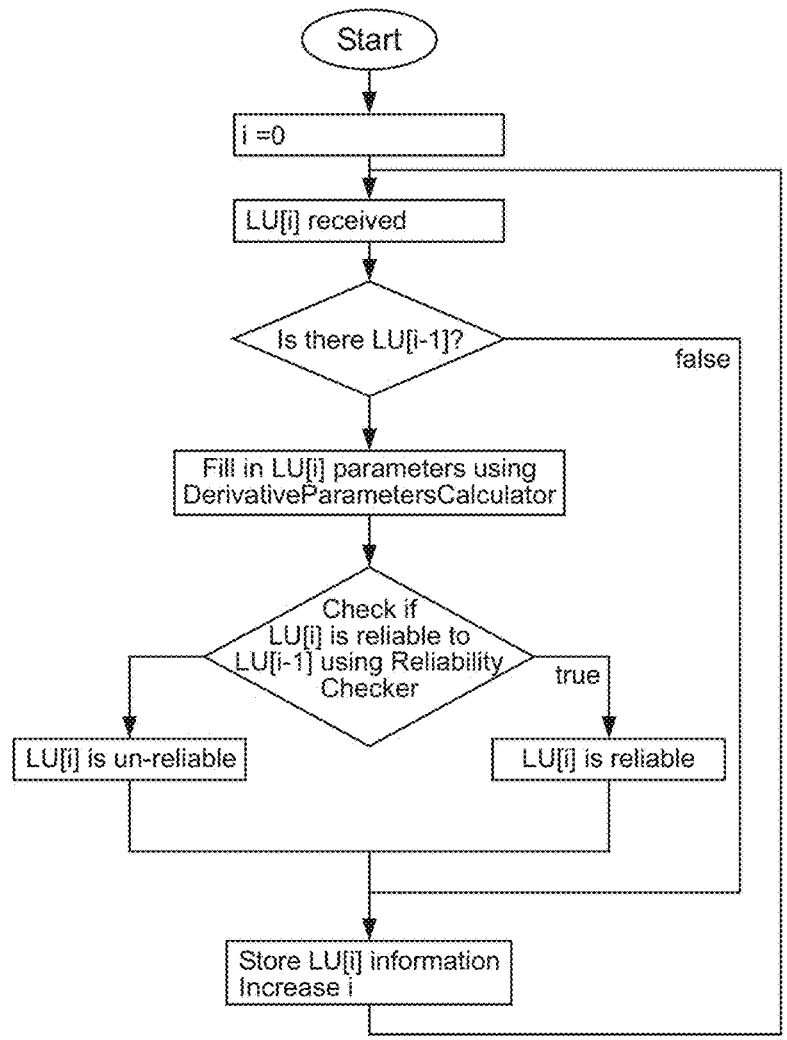
FIG. 14 depicts a flow diagram of an embodiment of a filter for processing a sequence of LUs to determine reliable and unreliable LUs.

FIG. 14 depicts a flow diagram model of a filter for processing a sequence of LUs to determine reliable and unreliable LUs. Since this model is applied to the very first LU received that input is termed the i=0 input. The ith LU is incrementally input once the i−1 LU has been determined to be reliable or not. The first decision point in the flow is to determine whether there is a prior LU and if not to Store the LU(i) information and increment to the next LU, thus ensuring that a comparison between a prior and next LU can be performed. The next step is to apply the derivative parameters calculator (to be described in association with FIG. 15). The following step is a decision step which determines using the reliability checker (to be described in association with FIG. 16) whether LU(i) is reliable (true) concerning LU(i−1) or unreliable (false) with respect to LU(i−1). There after the method includes storing the LU(i) information and increasing i.

Figure 15:
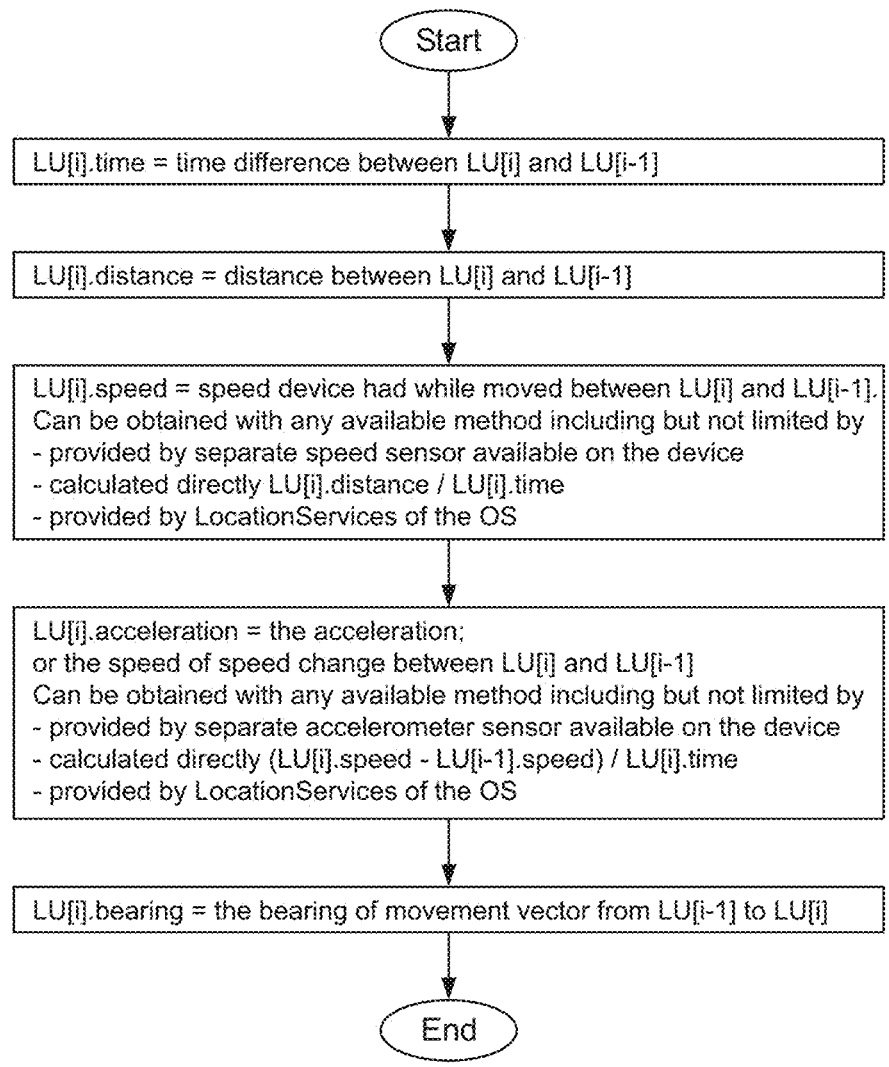
FIG. 15 depicts a flow diagram of an embodiment method for calculating LU[i] derivative parameters of the previous LU[i−1]

FIG. 15 depicts a flow diagram for calculating LU[i] derivative parameters of the previous LU[i−1], the parameters calculated include for differences between the LU(i) information and the LU(i−1) information: time, distance, speed, acceleration and bearing.

Differences in time and distance are readily obtained from the LU basic information provided by all GPS chips but can be derived from alternative sources as well.

While LU[i].speed=speed of the device while moved between LU[i] and LU[i−1] can be obtained by any available method including but not limited:
provided by separate speed sensor available on the device
calculated directly the LU[i].distance/LU[i].time
provided by LocationServices of the mobile device Operating System.

As with positioning, the speed accuracy of GPS depends on many factors. A GPS signal in space with a global average user range rate error (URRE) of ≤0.006 m/sec over any 3-second interval, with 95% probability. This measure must be combined with other factors including satellite geometry, signal blockage, atmospheric conditions, and receiver design features/quality, to calculate a particular receiver's speed accuracy.

While LU[i].acceleration=the acceleration or the speed of speed change between LU[i] and LU[i−1], can be obtained using any available method including but not limited by:
separate accelerometer sensor available on the device
calculated directly (LU[i].speed−LU[i−1].speed)/LU[i].time
provided by LocationDeterminationServices of the mobile device Operating System.

While LU[i].bearing=the bearing of movement vector calculated using the LU[i−1] to the LU[i]

Figure 16:
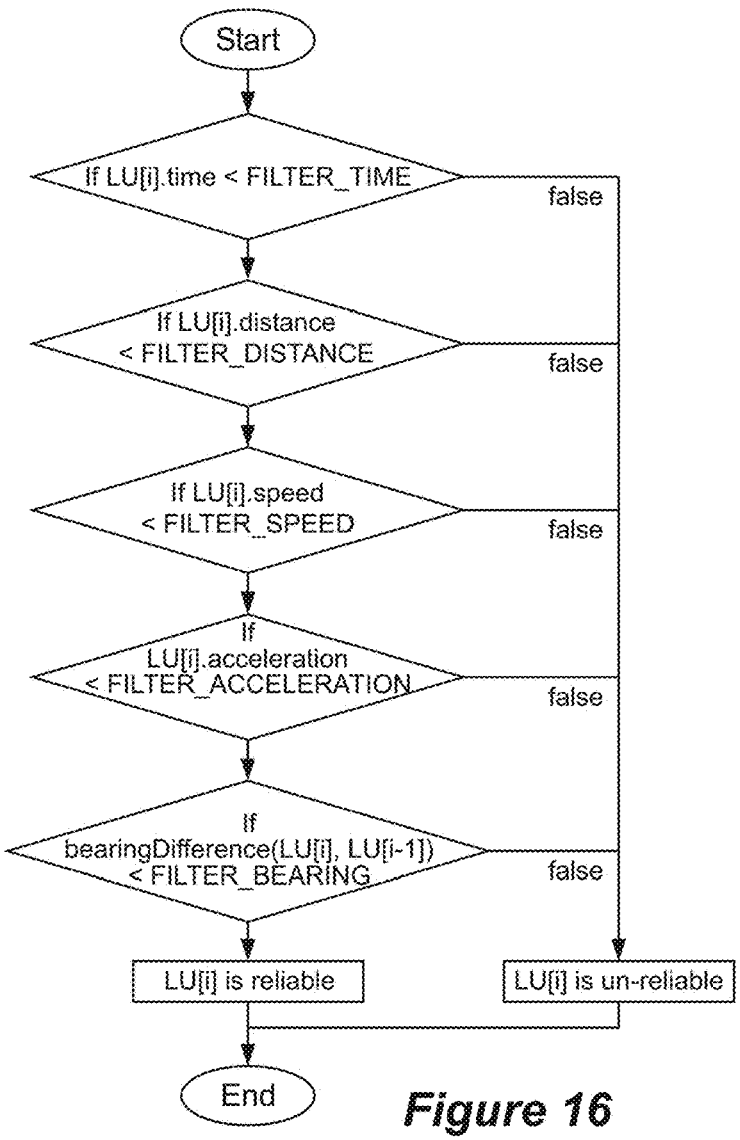
FIG. 16 depicts a flow diagram of an embodiment method for checking reliability of one LU compared to another LU.

FIG. 16 depicts a flow diagram for checking the reliability of one LU compared to another LU once the various differential parameters are calculated. By way of example in this general model where if any of the applied filter values create a false output the related LU is deemed to be unreliable.

The reliability checker is responsible for checking if LU[i] is reliable with respect to LU[i−1] The filter parameters, depending on the rate of Location Updates and the user scenario and environment, can use a reasonable value from the range indicated below:
FILTER_TIME: 3 sec-5 mins;
FILTER_DISTANCE: 2 meters-1 kilometer;
FILTER_SPEED: from 0.25 meter per second (slowly walking pedestrian) to 111 meters per second (400 km/h passenger train);
FILTER_ACCELERATION: from 0 meters per second per second (for stationary devices) to 18.51 meter per second per second (0-60 mph in 1.5 seconds for a fast moving vehicle)
FILTER_BEARING: from 2 degrees for train/highway scenario to 180 degrees for frequently twisting pedestrian walk FIGS. 13 to 16 disclose a general model while FIGS. 17 to 22 discloses an embodiment implemented to provide a reliability checker for received LUs.

Figure 17:
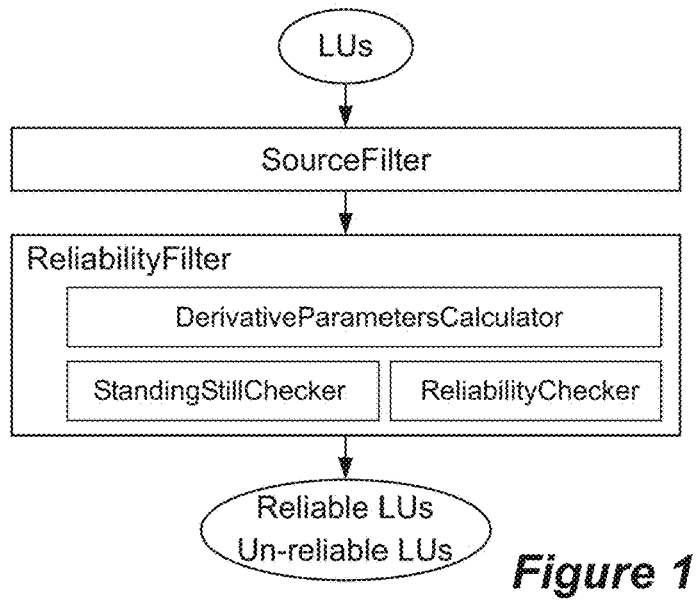
FIG. 17 depicts a flow diagram of the steps of an embodiment for processing LUs to determine reliable and unreliable LUs including a standing still checker.

FIG. 17 depicts a flow diagram of the steps of an embodiment for processing LUs to determine reliable and unreliable LUs. The steps comprise, in one embodiment, applying a source filter described in relation to FIG. 18. Then applying a reliability filter arrangement comprising a derivative parameter calculator (to be described in relation to FIG. 20). Then applying standing still checker (to be described in relation to FIG. 21), and the overall reliability checking process utilising these checkers and calculator.

Figure 18:
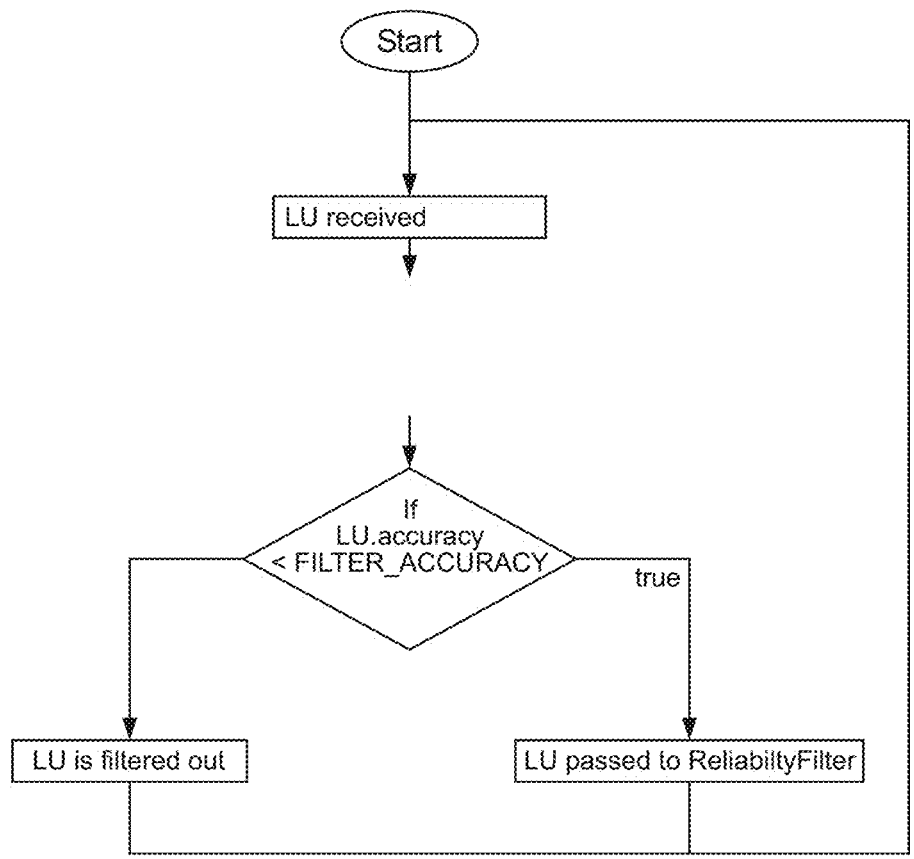
FIG. 18 depicts a flow diagram of the steps of an embodiment of a source filter to determine the likely source of an LU.

FIG. 18 depicts a flow diagram of the steps of a source filter to determine the likely source of an LU, wherein the filter is responsible for determining the likely source of an LU from one or more of the following sources (this filter is an optional filter in the method disclosed in this document):
GPS
WiFi
Cell tower
Fused (combination of one or more of the above and possibly other sources of LUs)

Only the GPS and Fused (if fused has the relevant accuracy) are sufficiently accurate to be passed forward and further reviewed by the Reliability Filter. The accuracy is sufficiently accurate if the measurement of the LU includes a self-generated accuracy measure that is of an acceptable value. In the case of GPS, accuracy is both internally and externally verifiable measurement, and since the interval between LUs is short (such as by way of example portions of a second and not as long as minutes), the accuracy of the GPS LU is affected by many influences. Those influences include not only multipath but also random noise, internal biases, and any effects there may be in using less than the ideal than four to five satellites (four being a minimum number to obtain sufficient data and signal to derive the position of the receiver in all available dimensions). In such circumstances, the use of a predetermined accuracy limit needs to be chosen judiciously. However, fused LU determination which can provide an external measurement for comparison purposes can avoid some accuracy issues and enhance precision in the context of the LU update interval.

The accuracy of the LU is less than the FILTER_ACCURACY then the LU is passed on to the reliability filter, and the value can be acceptable if the accuracy value is 68% or above.

Accuracy in a GPS environment is, in fact, an Estimated Position Error and defined by stating both statistical and distance measures. The accuracy of a location determination of an LU can be expressed as the radius of 68% confidence. If you draw a circle centered at the determined LU location's latitude and longitude, and a radius of the circle equal to the accuracy quoted for the determination, then there is a 68% probability that the true location is inside the circle. In statistical terms, it is assumed that location errors are random with a normal distribution, so the 68% confidence circle represents one standard deviation. Note that in practice, location errors do not always follow such a simple distribution. This accuracy estimation is only concerned with horizontal accuracy and does not indicate the accuracy of bearing, velocity or altitude if those are included in the location determination. If the location determination does not have one accuracy value, then value 0.0 is returned. All locations generated by a GPS chips associated with a mobile computer device include an accuracy value. For example, 7.8 meters at 95% confidence interval-horizontal accuracy is receiver dependent on where the receiver is relative to all of the satellites, the angles to each satellite, etc. and vertical accuracy is generally worse, but the difference between accuracy and precision needs to be appreciated.

Figure 19:
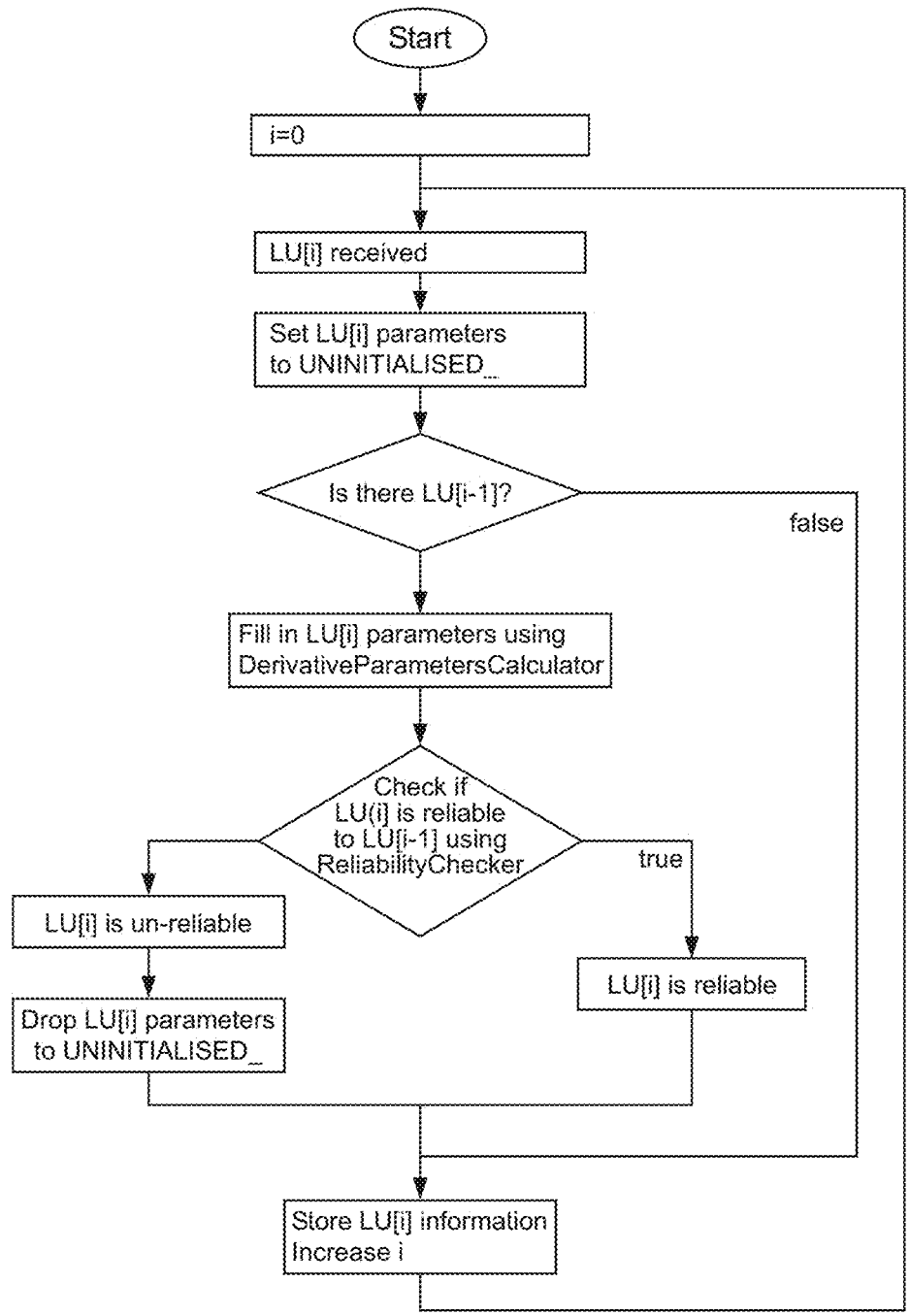
FIG. 19 depicts a flow diagram of the steps of an embodiment of a reliability filter comprising in part of the steps of an embodiment of a derivative parameters calculator (FIG. 20) and within that a standing still checker (FIG. 21)
Figure 20:
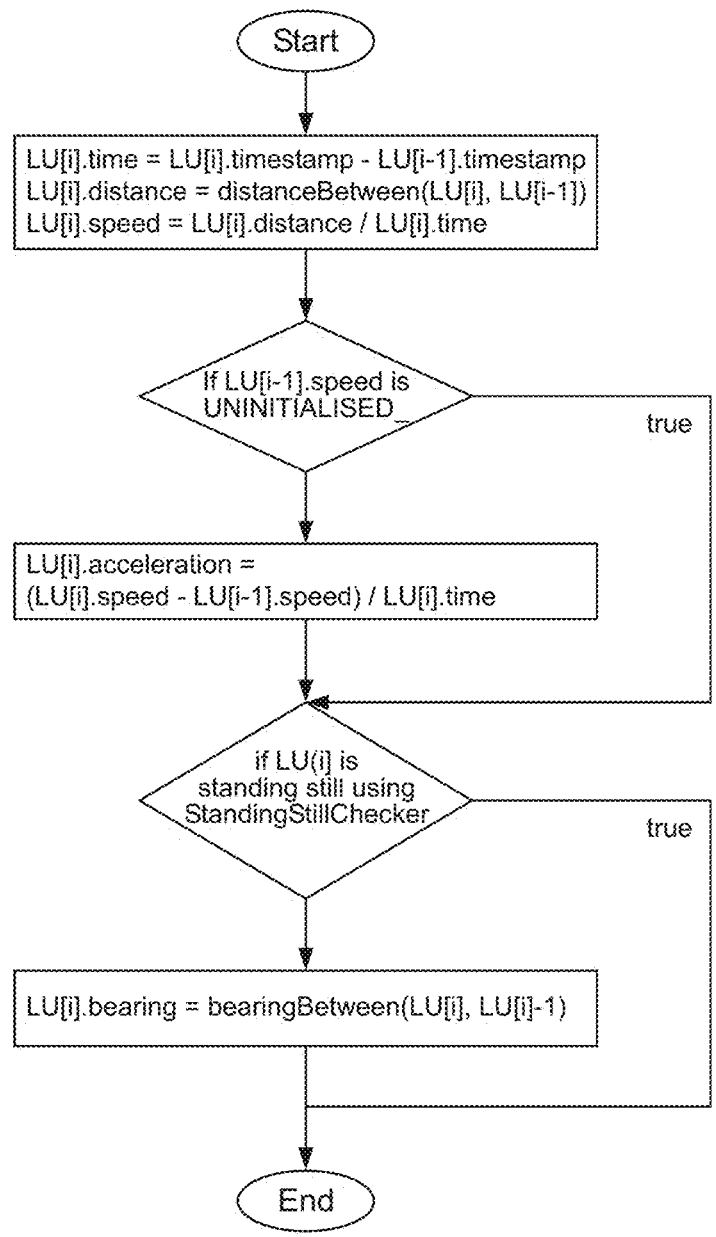
FIG. 20 depicts a flow diagram of an embodiment of a derivative parameters calculator.
Figure 21:
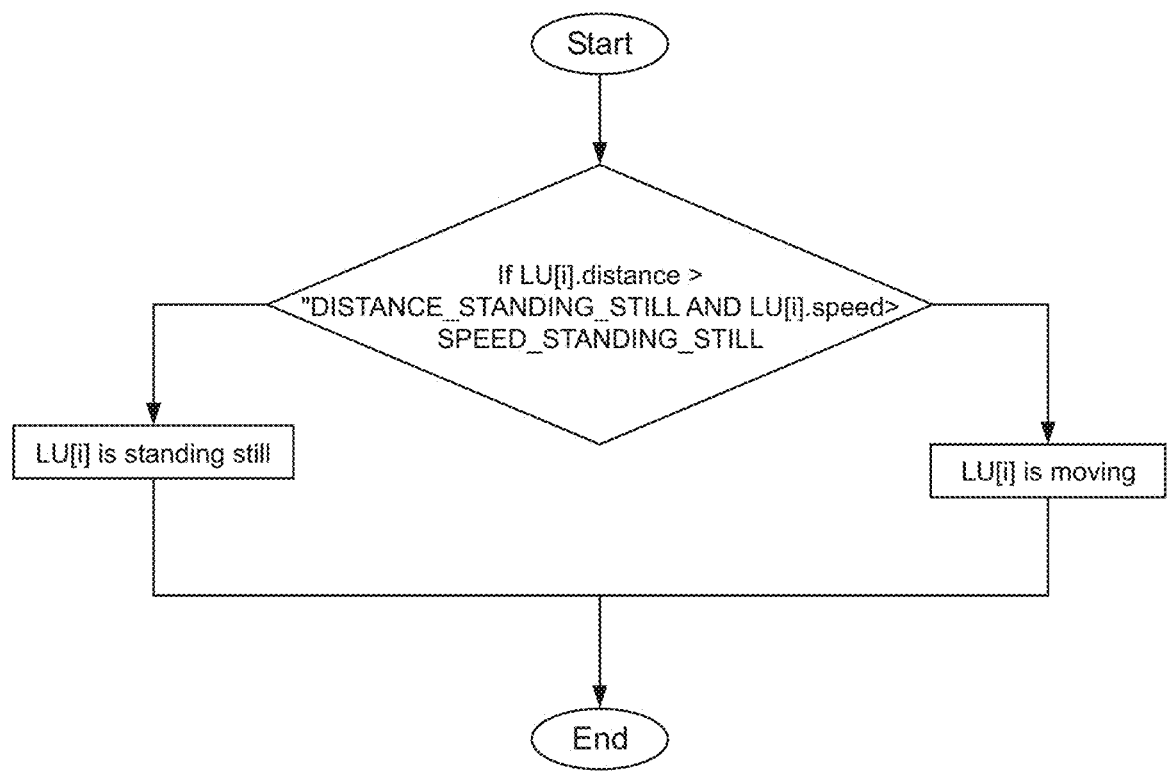
FIG. 21 depicts a flow diagram of an embodiment of a standing still checker.

FIG. 19 depicts a flow diagram of the function of a reliability filter comprising in part a derivative parameters calculator (as disclosed in FIG. 20) and within that a standing still checker (as disclosed in FIG. 21). This filter is much like the reliability filter discussed in relation to FIG. 14 a difference being the designation of LU(i) parameters to UNIITIALISED when LU(i) is deemed to be unreliable.

FIG. 20 depicts a flow diagram of a derivative parameters calculator responsible for calculating LU[i] derivative parameters based on the value of LU[i-1] parameters. The parameters calculated include for differences between the LU(i) information and the LU(i-1) information: time, distance, speed, acceleration and bearing. The first decision point of the parameter calculator relates to the previously discussed UNINITIALSED determination of the LU(i-1) speed determination and if true requires a jump to the Standing Still Checker which is discussed in more detail in relation to FIG. 21. Otherwise, as the calculator progresses the completion of the bearing calculation terminates the derivative parameters calculations.

FIG. 21 depicts a flow diagram of a standing still checker is responsible for checking if the device/used is standing still such that there is no bearing of movement determined which is checked by determining if the LU[i].distance>DISTANCE_STANDING_STILL AND LU[i].speed>SPEED_STANDING_STILL then the device is deemed to be standing still or moving. Values for these parameters are a matter of judgment and can be based on experiment, history of prior movement in a predetermined period, or reasonable approximations and by way of example, the DISTANCE_STANDING_STILL is a distance of 10 meters and the SPEED_STANDING_STILL speed is 2 kilometers per hour. There can also be a range for each of the parameters. Such as a distance greater than 0 and less than 10 (which may depend on the accuracy of the distance determination which can depend on the accuracy of location determination, due to multiple features as discussed herein). Further, such as a range of speed being greater than 0 and less than 4 kilometers per hour.

Figure 22:
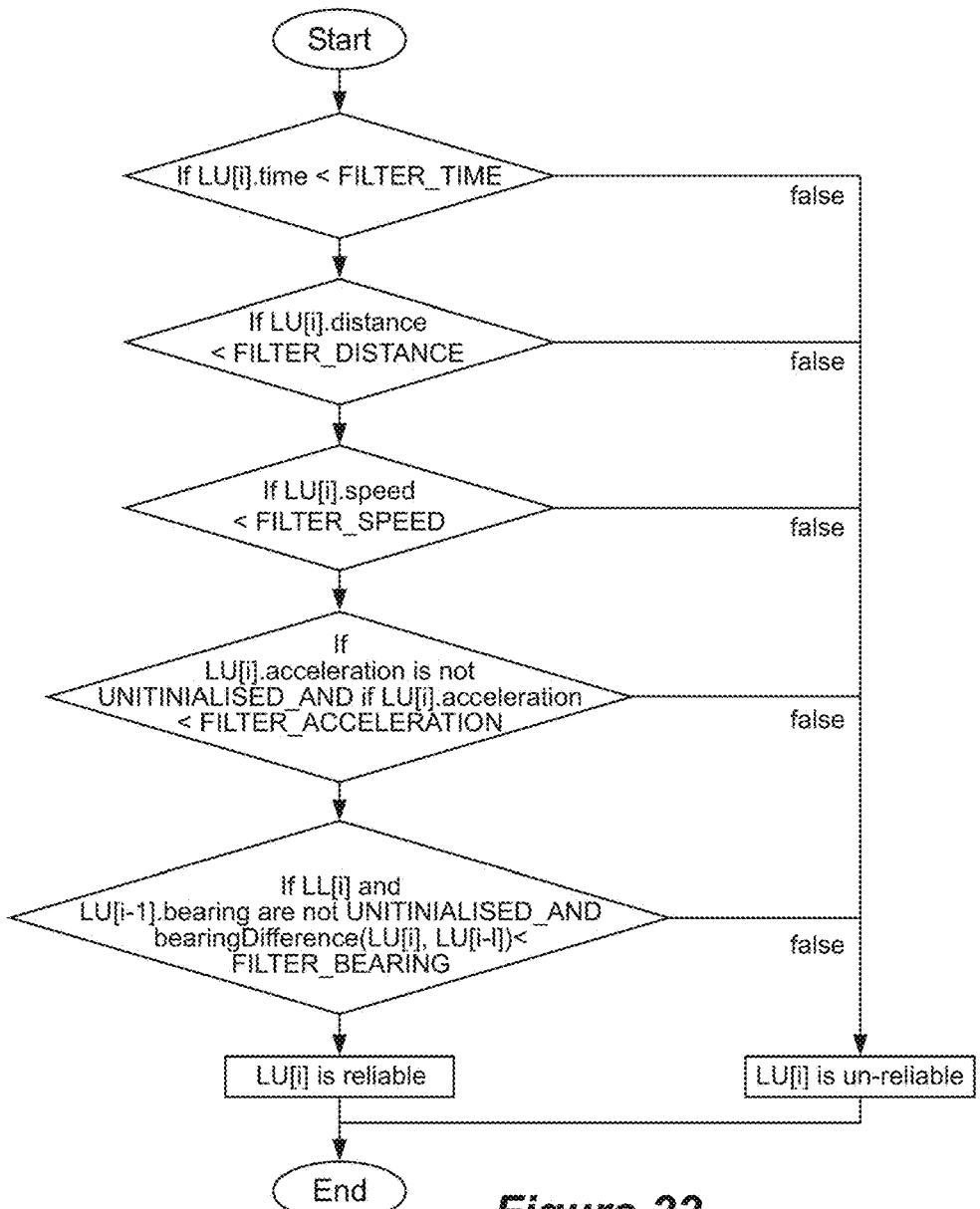
FIG. 22 depicts a flow diagram of an embodiment of a reliability checker.

FIG. 22 depicts a flow diagram of a reliability checker which is much like the reliability checker of FIG. 16 but different in respect to the acceleration and bearing determinations. If the LU[i].acceleration is not UNITINIALISED_AND If LU[i].acceleration<FILTER_ACCELERATION then the checker will progress to the next check but if false then LU(i) is unreliable. Likewise if the LU[i] and LU[i-1].bearing are not UNITINIALISED_AND bearing Difference(LU[i], LU[i-1])<FILTER_BEARING then the checker will progress to the next check but if false then LU(i) is unreliable.

The embodiment described is provided in the form of a software implemented method using a computer specifically arranged with memory and interfaces to one or more sources of LUs and timing circuits to ensure synchronicity with the various inputs of signals and information. Further, to allow for timing intervals that permit successive LUs to be received and for the required calculations to be performed before the next LU is received and for the prior LU to be treated according to the method and used accordingly.

Figure 23:
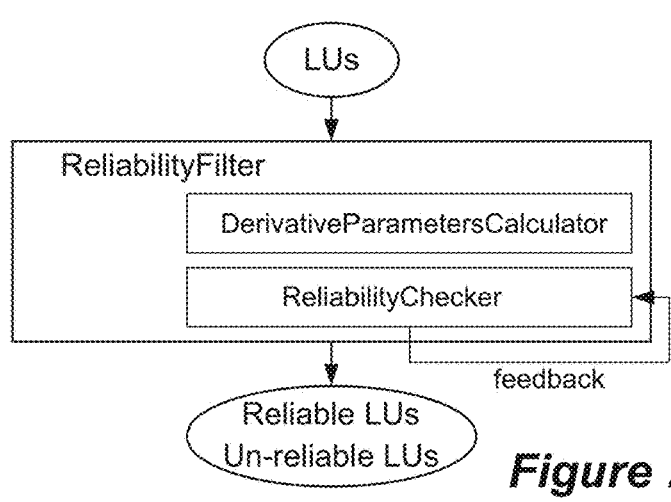
FIG. 23 depicts a further embodiment which accommodates feedback to the function of the reliability checker.

A yet further embodiment is disclosed which relies on the disclosure herein and adds a feedback loop useable for training and to dynamically align filter values to the scenario and condition in which the device is being used as depicted pictorially in FIG. 23.

As disclosed herein, there are LUs provided in sequence as determined and Reliable/Un-reliable LUs analysed and output with each Location Update marked as Reliable or Un-reliable. The Reliability Filter is the primary analysis module responsible for processing LUs (as disclosed in FIG. 24). The Derivative Parameters Calculator calculates each of the predetermined (although in some embodiments one only of the group is required) LU[i] derivative parameters using at least the previous LU[i-1] (as disclosed in FIG. 25). Further, a Reliability Checker is responsible for analysing if LU[i] is reliable with respect to a prior to LU[i-1] (as disclosed in FIG. 26). Further, this embodiment includes a feedback mechanism used for training of the operation of the Reliability Checker by dynamically aligning Filter values to the scenario/conditions of the mobile device.

Figure 24:
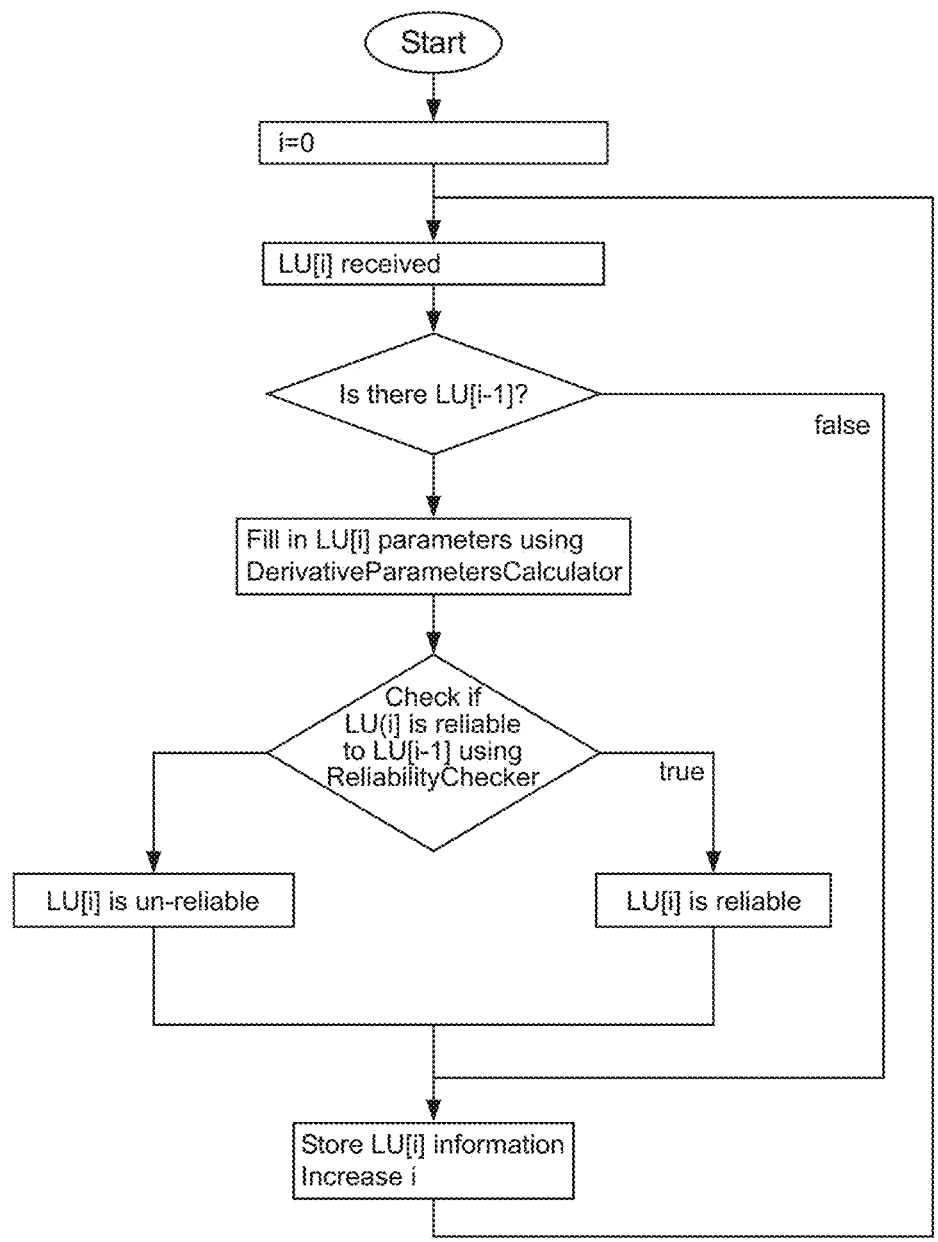
FIG. 24 depicts a flow diagram of the steps of an embodiment of a reliability filter suitable for the embodiment disclosed in association with FIG. 23.

FIG. 24 depicts a flow diagram of the function of a reliability filter suitable for the embodiment disclosed in association with FIG. 23 and the functionality it provides is much the same as that disclosed in FIGS. 14 and 19.

Figure 25:
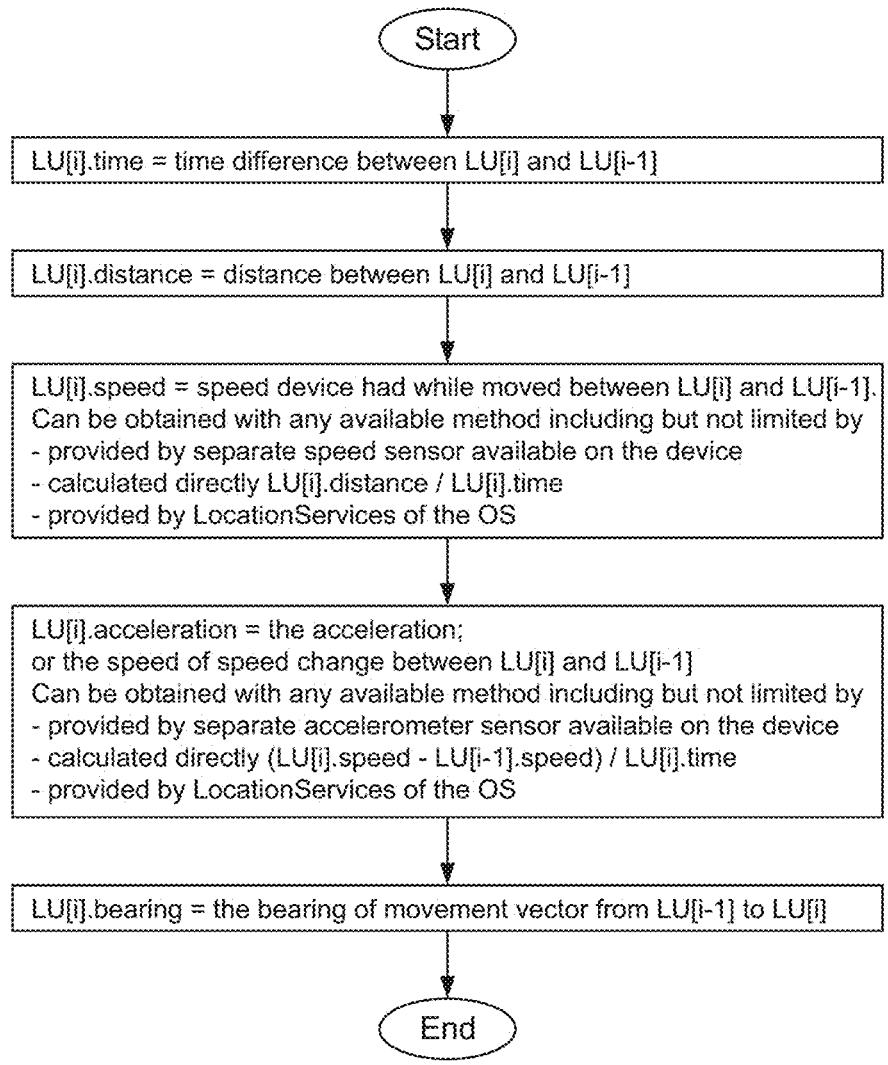
FIG. 25 depicts a flow diagram of the steps of an embodiment of a derivative parameters calculator suitable for the embodiment disclosed in association with FIG. 23.

FIG. 25 depicts a flow diagram of a derivative parameters calculator suitable for the embodiment disclosed in association with FIG. 23 and the functionality it provides is much the same as that disclosed in FIGS. 15 and 20.

Figures 26, 27:
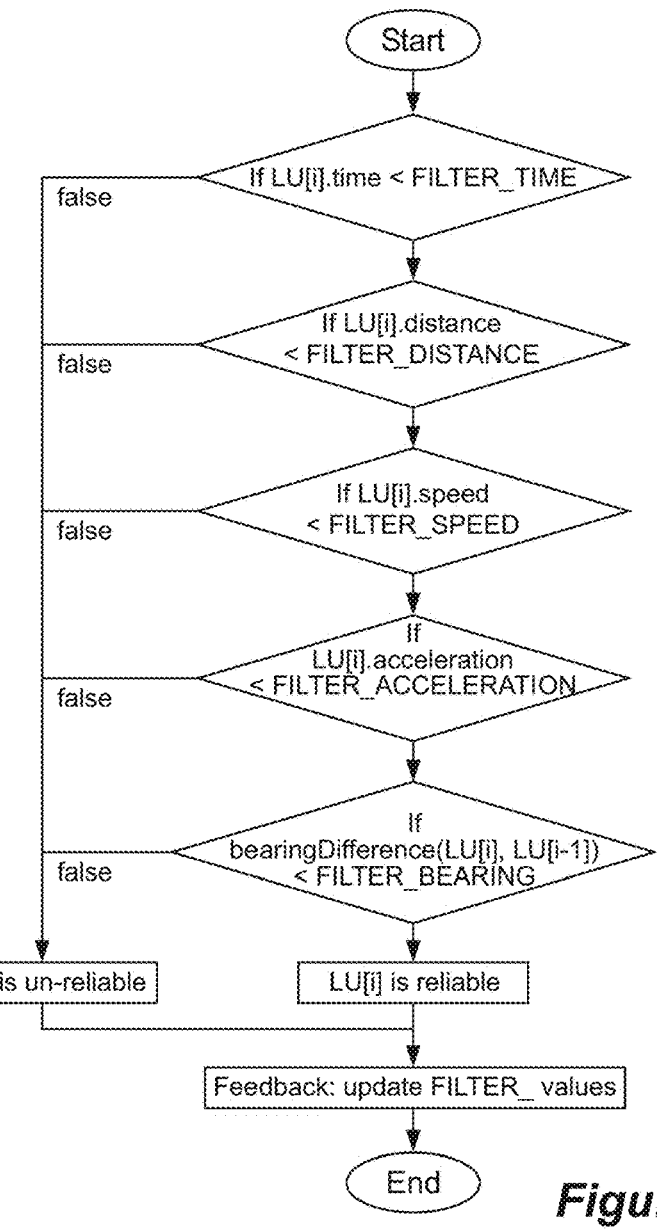
FIG. 26 depicts a flow diagram of the steps of an embodiment of a reliability checker suitable for the embodiment disclosed in association with FIG. 23.
FIGS. 27 and 28 provide a statistical analysis of the various parameters used to determine the unreliability of an LU based on prior tracked data using some of the embodiments disclosed.

FIG. 26 depicts a flow diagram of a reliability checker suitable for the embodiment disclosed in association with FIG. 23. The functionality the reliability checker provides is much the same as that disclosed in FIGS. 16 and 22 but with the added step of there being at the end of the process a feedback mechanism which applies the FILTER_values dynamically tracking the real LU[i].* value and aligning the predetermined values of various characteristics.

As a further enhancement of the operation of the determination and use or non-use of LUs, it is possible to apply the steps of the embodiments disclosed herein using LUs collected during prior tracking exercises, wherein note is taken, of the environment of the track during the collection of LUs. FIGS. 27 and 28 provide a statistical analysis of the various parameters used to determine the unreliability of an LU. The analysis indicates that acceleration is the primary filter in a vehicle driving or transport environment of the device. The analysis also indicates that bearing is the primary filter in an outdoor walking in a canyon like environment such as a Central Business District. Further time is the primary filter in an indoors environment when the device is likely to have less LUs available. In all the implementations disclosed herein the setting of a weighting of '1' for all scenarios is used meaning that any one of the parameters being met will mean that an LU is unreliable. It is however available for the user of these techniques to weight them differentially to take account of the environment and use of the device using LUs. See also FIGS. 27 and 28, for example, when the application using the LUs is set to be most useful for a user that is walking then the difference in the bearing is weighted more than the speed condition and the distance condition. In another example, when the application using the LUs can determine that the device is located on a fast moving transport vehicle, the acceleration condition will be weighted more than the difference in bearing weighting, and the difference in bearing, etc. Weighting can be achieved in a number of ways, one of which includes reducing or increasing the predetermined measure of speed, distance, acceleration, difference in bearing or time period. In another example, the weighting can be achieved by applying a percentage difference to increase or decrease a predetermined measure such that the same percentage or a different percentage applies to one or all the predetermined measures.

Figure 30:
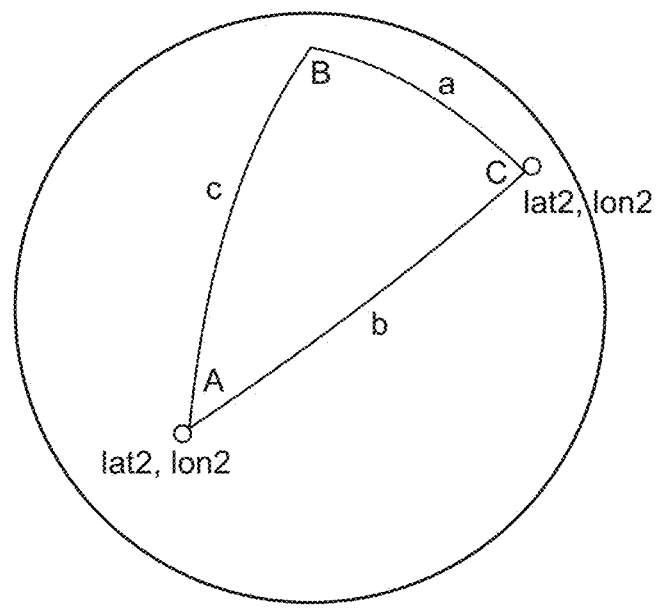
FIG. 30 depicts a pictorial representation of a distance measurement and a formula for performing that calculation.

Referring to FIG. 30 the type of calculation disclosed is not trivial if relative accuracy is required, where one of the complicating factors is taking the curvature of the Earth into account, as illustrated by the shapes and lines depicted in FIG. 1. In one example, all calculations are performed using 3 dimensional rather than two-dimensional coordinates within the chosen datum. For example as depicted using the formula depicted which applies for small angles as would be the case in most applications where the distances involved between LUs is typically a local area not a country's surface on the Earth. It is possible to use the Haversine formula (provided in FIG. 30) to calculate the great circle distance between two points being the shortest distance across the surface of the earth.

$$a = \sin^2(\Delta\varphi/2) + \cos\varphi_1 \cdot \cos\varphi_2 \cdot \sin^2(\Delta\lambda/2)$$

$$c = 2 \cdot a\tan 2(\sqrt{a}, \sqrt{(1-a)})$$

$$d = R \cdot c$$

where $\varphi$ is latitude, $\lambda$ is longitude, R is earth's radius (mean radius=6,371 km);

Note that angles need to be in radians to pass to trig functions. Note concerning FIG. 30 $c$ is the angular distance in radians, and a is the square of half the chord length between the points. Calculations of this type are well known and the code to implement them equally well known and available as subroutines in various computer executable languages and code.

If the elevation is required, then a geoid model of the Earth can be used so that some calculations will require an elevation component.

Although the preceding embodiments are described in some detail for purposes of clarity of understanding, it will be apparent that certain changes and modifications may be practised within the scope of the appended claims. It should be noted that there are many alternative ways of implementing the steps of the methods of the present embodiments. Accordingly, the present embodiments are to be considered as illustrative and not restrictive and are not to be limited to the details given herein.

The invention claimed is:

1. A method of determining the unreliability of a location determination (LU) of a device, wherein the device is configured to perform an action in response to a determination of the mobile device being located at a predetermined location or within an area about the predetermined location or the device crossing a virtual boundary line, the method comprising:
   performing a first location determination (LU) comprising determining a first location of the device, a first time of the first location determination, and at least one of:
      a speed of the device at the first location;
      a distance difference corresponding a difference between the first location and a second location associated with a prior location determination;
      an acceleration of the device between the first location corresponding to a rate of change of the speed of the device between the first location and the second location; and
      a bearing difference corresponding to a difference in a bearing path of the device to the first location and a bearing of a path of the device away from the first location;
   determining that the first LU is unreliable based upon one or more of a set of conditions comprising:
      whether the speed of the device at the first location is greater than a predetermined speed;
      whether the distance difference is greater than a predetermined distance;
      whether the acceleration of the device is greater than a predetermined acceleration;
      whether the bearing difference is greater than a predetermined angle in any plane; or
      whether the time period; between the first location determination and the prior determination is greater than a predetermined period; and
   using the determination by the device that the first LU is unreliable to dismiss the first LU as a trigger for the action.

2. A method according to claim 1 wherein:
   the predetermined speed is 41.66 meters per second;
   the predetermined distance difference is 77 meters;
   the predetermined acceleration is 6.7056 meters per second per second;
   the predetermined difference in bearing is 90 degrees;
   the predetermined period is 15 seconds.

3. A method according to claim 1, wherein the first location determination is represented by LU[i] and the prior location determination is represented by LU[i−1], and further comprising performing a standing still check wherein the device is considered to be standing still if:
   the distance difference, LU[i].distance, where LU[i].distance equals the distance between LU[i] and LU[i−1], is less than a predetermined standing still distance DISTANCE_STANDING_STILL, and LU[i].speed, which equals LU[i].distance divided by LU[i].time, where LU[i].time equals a difference between the time of LU[i] and a time of LU[i−1], is less than a prdetermined standing still speed SPEED_STANDING_STILL.

4. A method according to claim 1 wherein the first location determination is part of a sequence of multiple related location determinations from which to determine unreliability of one or more of the multiple locations determinations, the method further comprising the steps:
   determining that a time between a first reliable LU and second reliable LU of the multiple related location determinations is less than a predetermined timeout period GPS_SIGNAL_LOST_TIMEOUT_ms=20*1000 ms; and performing a likely path analysis to generate a likely path between the first reliable LU and the second LU.

5. A method according to claim 1 wherein the first location determination is part of a sequence of multiple related location determinations from which to determine unreliability of one or more of the multiple locations determinations, the method further comprising the steps:
determining one or more unreliable LUs of the multiple related location determinations that are separated by at least a first reliable LU ahead and at least one second reliable LU behind the at least one unreliable LU by a predetermined time or distance; and
performing a likely path analysis to generate a likely path between the first reliable LU and the second reliable LU.

6. A method according to claim 5 wherein the first location determination is part of a sequence of multiple related location determinations from which to determine unreliability of one or more of the multiple locations determinations, the method further comprises the further step:
determining whether one or more of the generated unreliable LUs is related to a geo-fence or other location dependent data.

7. A method according to claim 1 wherein the first location determination is part of a sequence of multiple related location determinations from which to determine unreliability of one or more of the multiple locations determinations, the method further comprises the further step:
determining the distance between a first reliable LU and a second LU of the multiple related location determinations is greater than a predetermined average geofence size AVERAGE_FENCE_SIZE_m.

8. A method according to claim 7 wherein AVERAGE_FENCE_SIZE_m equals 20 meters.

9. A method according to claim 3 wherein the DISTANCE_STANDING_STILL is a distance of 10 meters and the SPEED_STANDING_STILL speed is 2 kilometers per hour.

10. A method according to claim 3, wherein the first location determination is part of a sequence of multiple related location determinations for which to determine unreliability of one or more of the multiple location determinations.

11. A method according to claim 10, wherein the determination that the first LU is unreliable is performed prior to performing a subsequent location determination of the sequence of multiple related location determinations.

12. A method of determining the unreliability of a location determination of a device, wherein the device is configured to perform an action in response to a determination of the mobile device being located at a predetermined location or within an area about the predetermined location or the device crossing a virtual boundary line, the method comprising:
performing a first location determination to determine a first location of the device and a time of the first location determination, wherein the first location determination of the device further comprises determinating additional characteristics including a first speed of the device, and a first bearing of a path of the device, using at least a prior determined location and a time of the prior determination of the device;
performing a second location determination to determine a second location of the device and a time of the second location determination, wherein the second location determination further comprises determining a time period between the first and second location determinations and at least one of:
a second speed of the device;
a distance difference between the first location and the second location of the device;
an acceleration of the device being the rate of change of the speed of the device between the first location and the second location of the device;
a second bearing of the path of the device between the first location and the second location of the device;
determining that the second location determination of the device is unreliable based upon one or more of a set of conditions comprising:
whether the second speed of the device at the second location is greater than a predetermined speed;
whether the distance difference between the first location and the second location of the device is greater than a predetermined distance;
whether the acceleration of the device is greater than a predetermined acceleration;
whether a difference in the first bearing of the path of the device between the prior location and the first location, and the second bearing of the path of the device between first location and the second location is greater than a predetermined angle in any plane; or
whether the time period, between the first location and the second location determinations is greater than a predetermined period; and
using the determination by the device that the second location determination is unreliable to dismiss the second location determination as a trigger for the action.

13. A method according to claim 12 wherein:
the predetermined speed is 41.66 meters per second;
the predetermined distance is 77 meters;
the predetermined acceleration is 6.7056 meters per second per second;
the predetermined difference in bearing is 90 degrees; and
the predetermined period is 15 seconds.

14. A method according to claim 12, wherein the determination that the second location determination of the device is unreliable comprise weighing a plurality of conditions of the set of conditions based upon a current use of the device.

15. A method according to claim 12 wherein a characteristic of the first location determination can be deemed to be uninitialized if there is no prior location determination or the prior location determination does not meet a predetermined criteria.

* * * * *